US010082423B2

United States Patent
Gatto et al.

(10) Patent No.: US 10,082,423 B2
(45) Date of Patent: Sep. 25, 2018

(54) METHOD, ELECTRONIC DEVICE AND SYSTEM FOR MONITORING A SKIN SURFACE CONDITION

(71) Applicant: Sony CORPORATION, Tokyo (JP)

(72) Inventors: Alexander Gatto, Stuttgart (DE); Piergiorgio Sartor, Stuttgart (DE); Ralf Mueller, Stuttgart (DE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/547,848

(22) PCT Filed: Feb. 18, 2016

(86) PCT No.: PCT/EP2016/053474
§ 371 (c)(1),
(2) Date: Aug. 1, 2017

(87) PCT Pub. No.: WO2016/131927
PCT Pub. Date: Aug. 25, 2016

(65) Prior Publication Data
US 2018/0024002 A1    Jan. 25, 2018

(30) Foreign Application Priority Data
Feb. 19, 2015    (EP) .................................... 15155848

(51) Int. Cl.
*G01J 1/42*    (2006.01)
*G01J 1/02*    (2006.01)

(52) U.S. Cl.
CPC ............. *G01J 1/429* (2013.01); *G01J 1/0219* (2013.01); *G01J 1/4228* (2013.01); *G01J 2001/0257* (2013.01); *G01J 2001/4266* (2013.01)

(58) Field of Classification Search
CPC .......... G01J 1/02; G01J 1/0219; G01J 1/0228; G01J 1/0233; G01J 1/0247; G01J 1/0271; G01J 1/4228; G01J 1/429
See application file for complete search history.

(56) References Cited

U.S. PATENT DOCUMENTS

| 4,749,865 | A | 6/1988 | Scheller |
| 5,365,068 | A | 11/1994 | Dickerson |
| 9,068,887 | B1* | 6/2015 | Bennouri ................. G01J 1/429 |
| 9,753,182 | B1* | 9/2017 | Bennouri ................. G01W 1/02 |
| 9,816,857 | B2* | 11/2017 | Rastegar ................. G01J 1/429 |
| 9,823,120 | B2* | 11/2017 | Lian ......................... G01J 1/429 |
| 2008/0265170 | A1 | 10/2008 | Ales et al. |

(Continued)

FOREIGN PATENT DOCUMENTS

| AU | 2001261065 B2 | 1/2002 |
| EP | 2756274 A1 | 7/2014 |

(Continued)

OTHER PUBLICATIONS

Thomas Fahrni, et al., "Sundroid: Solar Radiation Awareness with Smartphones," UbiComp'11, Sep. 17-21, 2011, (10 pages).

(Continued)

*Primary Examiner* — Kiho Kim
(74) *Attorney, Agent, or Firm* — Xsensus, LLP

(57) ABSTRACT

An electronic device including a processor configured to receive a first radiation measurement and determine a skin surface condition information based on the first radiation measurement.

25 Claims, 23 Drawing Sheets

(56) References Cited

U.S. PATENT DOCUMENTS

| | | |
|---|---|---|
| 2010/0185064 A1 | 7/2010 | Bandic et al. |
| 2012/0326046 A1 | 12/2012 | Aslam et al. |
| 2015/0041663 A1* | 2/2015 | Oliver .................. G01J 1/0219 250/372 |
| 2015/0102208 A1* | 4/2015 | Appelboom ........ G06F 19/3481 250/208.2 |
| 2015/0164405 A1* | 6/2015 | De Guia ................ A61B 5/441 382/128 |
| 2015/0177063 A1* | 6/2015 | Lian ...................... G01J 1/0403 250/372 |
| 2015/0338272 A1* | 11/2015 | Rastegar ............... G01J 1/0271 250/372 |
| 2016/0061657 A1* | 3/2016 | Lapiere .................. G01J 1/429 250/372 |

FOREIGN PATENT DOCUMENTS

| | | |
|---|---|---|
| WO | 2012/166882 A1 | 12/2012 |
| WO | 2014/153582 A1 | 10/2014 |

OTHER PUBLICATIONS

International Search Report and Written Opinion dated Aug. 1, 2016 in PCT/EP2016/053474 filed Feb. 18, 2016.

* cited by examiner

4

```
┌─────────────────────────────────────────────────────────────┐
│ Generating a user message indicating on a display screen an │
│ invitation to a user to position a sensor to a first        │─40
│ location of a user's skin, where no sun cream is applied    │
└─────────────────────────────────────────────────────────────┘
                              │
                              ▼
┌─────────────────────────────────────────────────────────────┐
│ Recognizing that the sensor is positioned to the first      │─41
│ location                                                     │
└─────────────────────────────────────────────────────────────┘
                              │
                              ▼
┌─────────────────────────────────────────────────────────────┐
│ Receiving a radiation spectrum of the user's skin without   │
│ sun cream corresponding to a radiation reflected from the   │─42
│ first location                                              │
└─────────────────────────────────────────────────────────────┘
                              │
                              ▼
┌─────────────────────────────────────────────────────────────┐
│ Determining a skin type parameter of the user based on the  │─43
│ radiation spectrum of the user's skin without sun cream     │
└─────────────────────────────────────────────────────────────┘
```

Fig. 3

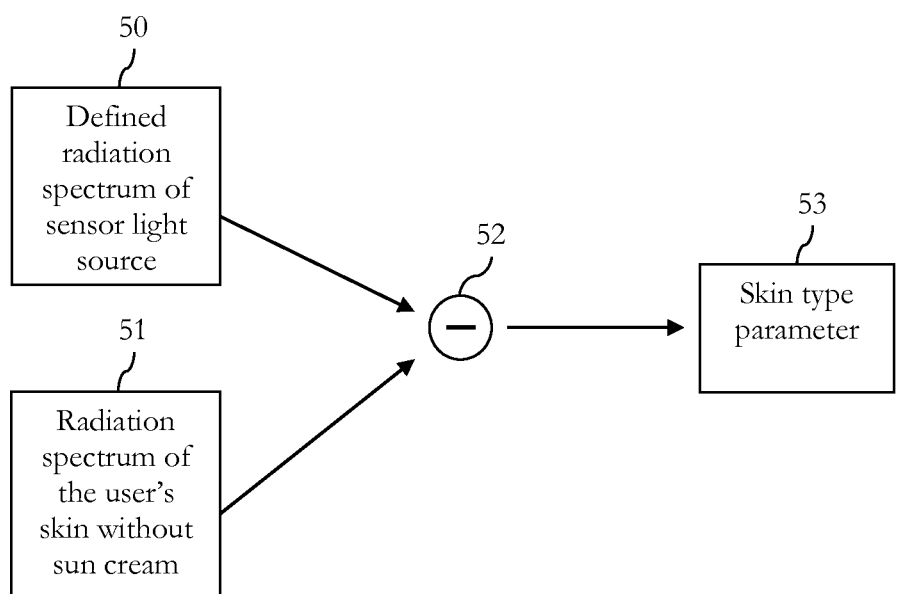

Fig. 4

| Skin type parameter / UVI | light | medium | dark |
|---|---|---|---|
| 1, 2 | 2h | 4h | 6h |
| 3, 4, 5 | 1h | 2h | 4h |
| 6, 7 | 45min | 1.5h | 2h |
| 8, 9, 10 | 30min | 1h | 1.5h |
| >10 | 10min | 20min | 30min |

| Skin type parameter | Radiation dose threshold |
|---|---|
| light | 10 |
| medium | 20 |
| dark | 30 |

| Skin type parameter / sun protection factor  UVI | Light / 10 | Medium / 10 | Dark / 10 | Light / 20 | ... |
|---|---|---|---|---|---|
| 1, 2 | 3h | 5h | 7h | 3.5h | ... |
| 3, 4, 5 | 2h | 3h | 5h | 2.5h | ... |
| 6, 7 | 1.5h | 2h | 3h | 2h | ... |
| 8, 9, 10 | 1h | 1.5h | 2h | 1.5h | ... |
| <10 | 20min | 30min | 40min | 30min | ... |

Fig. 14

| skin type parameter \ Sun protection parameter | 10 | 20 | 30 |
|---|---|---|---|
| light | 15 | 20 | 25 |
| medium | 25 | 30 | 35 |
| dark | 35 | 40 | 45 |

METHOD, ELECTRONIC DEVICE AND SYSTEM FOR MONITORING A SKIN SURFACE CONDITION

CROSS-REFERENCE TO RELATED APPLICATIONS

This application is a National Stage of International Application No. PCT/EP2016/053474, filed Feb. 18, 2016, claims priority to European Patent Application 15155848.3 filed by the European Patent Office on 19 Feb. 2015, the entire contents of which being incorporated herein by reference.

TECHNICAL FIELD

The present disclosure generally pertains to methods, electronic devices and systems of electronic devices which are used in situations, in which a user exposes oneself to solar radiation, for example methods, electronic devices and systems of electronic devices which are used for monitoring skin surface condition information of a user exposed to solar-radiation, for instance ultraviolet radiation (UV-radiation).

TECHNICAL BACKGROUND

People who spend longer time outdoors, for example people, who enjoy nature or work outdoors, often forget to apply sun cream to their skin, to reapply sun cream after a predetermined period of time or to stop exposing oneself to UV-radiation. Thus, they face the risk of getting sunburn and of endangering their health.

It is generally known, to generate information on intensity of UV-radiation at the beginning of as well as during sunbathing. This information can be used for estimating a time span, during which a probability of getting sunburn is low, for warning the user of lapse of this time span or for inviting the user to stop sunbathing.

Although there are techniques for determining an intensity of UV-radiation, it is generally desirable to provide a method, an electronic device and a system, which reliably protect a user from getting sunburn.

SUMMARY

According to a first aspect the disclosure provides an electronic device including a processor configured to receive a first radiation measurement and to determine a skin surface condition information based on the first radiation measurement.

According to a second aspect the disclosure provides a method including receiving a first radiation measurement and determining a skin surface condition information based on the first radiation measurement.

According to a third aspect the disclosure provides a system including an electronic device according to the first aspect and several personal devices, wherein radiation measurements are received from sensors located in the personal devices.

According to a fourth aspect the disclosure provides a system including a main device and several electronic devices according to the first aspect, wherein skin surface condition information are provided from the personal devices to the main device.

Further aspects are set forth in the dependent claims, the following description and the drawings.

BRIEF DESCRIPTION OF THE DRAWINGS

Embodiments are explained by way of example with respect to the accompanying drawings, in which:

FIG. 3 schematically illustrates a method for providing a skin type parameter;

FIG. 4 schematically illustrates an example of determining the skin type parameter based on a radiation spectrum of a user's skin without sun cream while providing the skin type parameter according to FIG. 3;

FIG. 14 schematically illustrates an example of determining the time period for which a user may expose his skin to sun light without getting sunburn while providing this time period according to FIG. 13;

DETAILED DESCRIPTION OF EMBODIMENTS

Figure 1:
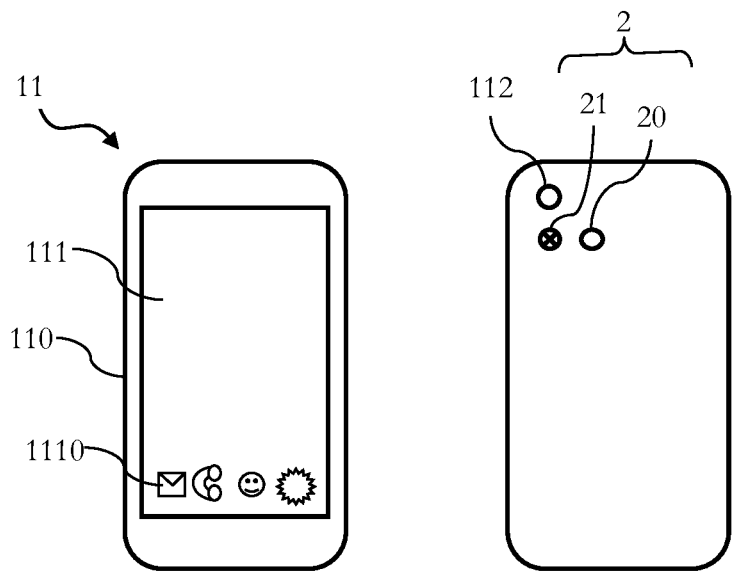
FIG. 1 schematically illustrates an embodiment of an electronic device in form of a smart phone configured to provide a user with a skin surface condition information.

Before a detailed description of the embodiments under reference of FIG. 1 to FIG. 35, general explanations are made.

The methods, electronic devices and systems disclosed below may be used to protect a user from getting sunburn and to reduce the probability of getting skin cancer. They can provide the user with reliable information concerning a solar radiation, the user's skin characteristic and/or a sun cream, for example the user's skin type, information, whether sun cream is applied at all, and/or features of the user's sun cream, which are in the following denoted as skin surface condition information (also denoted as sunbathing parameter).

The methods disclosed below may be implemented in an electronic device including a processor, which is configured to execute the respective method.

A method for providing a skin surface condition information includes receiving a first radiation measurement and determining a skin surface condition information based on the first radiation measurement. The first radiation measurement may correspond to a radiation reflected from a location on a user's skin before or after applying sun cream to a surrounding area of the user's skin surrounding this location. The first radiation measurement may be received for example in real time from a sensor, which detects the radiation reflected from the location on the user's skin. The radiation reflected from the location on the user's skin may be a radiation output by an artificial light source and reflected by the user's skin at the mentioned location on the user's skin. The artificial light source may be arranged in the vicinity of the sensor. The artificial light source may be configured to output a continuous spectrum, for example in a predetermined spectral range, for instance the artificial light source may be a day light lamp, a flashlight or an aggregation of LEDs. The artificial light source alternatively may be configured to output two or more spectral lines each having a predetermined wavelength. Alternatively, in particular in case that the first measurement corresponds to a radiation reflected from the location on a user's skin before applying sun cream, the first radiation measurement may be received from a data storage or a cloud including a user profile to which the first radiation measurement was added after it was detected by a sensor once, for example, when the method for providing a skin surface condition information was carried out by the user for the first time.

In some embodiments the method for providing a skin surface condition information further includes receiving a second radiation measurement and determining the skin surface condition information based on the first radiation measurement and the second radiation measurement.

The second radiation measurement may be an ambient radiation. Ambient radiation may include solar radiation on a sunny day and/or on a cloudy day, for example a UV-radiation. The ambient radiation may be received for example in real time from a sensor, which detects the ambient radiation. During detection of the ambient radiation the sensor may be oriented in any direction towards the surrounding field, for example oriented towards the sky.

Alternatively, the first radiation measurement may correspond to a radiation reflected from a first location on a user's skin before applying sun cream to the surrounding area and the second radiation measurement may correspond to a radiation reflected from a second location on a user's skin in the surrounding area after applying sun cream to the surrounding area. Then, the second radiation measurement may be received for example in real time from a sensor, which detects the radiation reflected from the second location on the user's skin.

Further alternatively, the first radiation measurement may correspond to a radiation in a first wavelength range reflected from a location on a user's skin and the second radiation measurement may correspond to a radiation in a second wavelength range other than the first wavelength range reflected from the same location on the user's skin, wherein the radiation in the first wavelength range and the radiation in the second wavelength range is measured at the same time, e.g. during a single measuring procedure and/or with a single measuring device. During both, the first radiation measurement and the second radiation measurement, sun cream is either applied or not applied to a surrounding area of the user's skin surrounding the location.

Each of the first radiation measurement and the second radiation measurement may comprise a radiation spectrum or a radiation having a single wavelength, in particular consisting of a single wavelength or a small wavelength zone of less than 50 nm, in particular 20 nm. The radiation spectrum may cover a wavelength range from 300 nm to 500 nm or a broader wavelength range. The radiation having a single wavelength may be a radiation at or around a wavelength in the range from 300 nm to 500 nm, e.g. between 380 nm and 390 nm, at about 400 nm or between 410 nm to 430 nm.

The location on the user's skin, for example the first location and/or the second location on the user's skin, may be any arbitrary position on the user's skin and the surrounding area surrounding the location, for example the first location and the second location, may be any area on the user's skin. For instance, the location and the surrounding area may be on a body part of the user, which is for example often exposed to ambient light, for instance to sun light, such as an arm or a leg of the user or the use's face.

The skin surface condition information may be a time period, an invitation to the user to stop sunbathing, an information, whether sun cream is applied, an actual sun protection factor, a filter type of an applied sun cream, a quality of sun protection and/or an actual amount of a sun cream and/or a required sun protection factor and/or a required amount of a sun cream. The time period may be a time period, for which the user may expose his skin to the ambient light without getting sunburn. The actual sun protection factor and/or the actual amount of the sun cream may be the sun protection factor and/or the amount of sun cream currently applied to the user's skin. The filter type of the applied sun cream may determine whether the applied sun cream includes an organic filter, an inorganic filter or both, organic and inorganic filters. The required sun protection factor and/or the required amount of sun cream may be the sun protection factor and/or the amount of sun cream to be applied for allowing a user to stay in ambient radiation for a desired time span without getting a sunburn, for example to expose the skin for a predetermined time period to the solar radiation.

In some embodiments determining the skin surface condition information may include determining a skin type parameter of a user by comparing the first radiation measurement to a reference radiation measurement. The reference radiation measurement may be a defined radiation spectrum of an artificial light source assigned to a sensor for detecting the first radiation measurement. The reference radiation measurement may be stored in a data storage. The artificial light source may be arranged in the vicinity of the sensor and/or may be configured to output a continuous spectrum as already mentioned above. For example, determining a skin type parameter may include subtracting the first radiation measurement from the reference radiation measurement and deriving the skin type parameter from the result of subtraction. Alternatively, determining the skin surface condition information may include determining a skin type parameter of a user based on a skin type parameter data model stored in data storage. For example, determining the skin type parameter may include choosing the skin type parameter corresponding to the first radiation measurement from a skin type parameter table indicating for various first radiation measurements a corresponding skin type parameter.

Determining the skin surface condition information may further include storing the skin type parameter to data storage or to gather the skin type parameter in a user profile, which may be stored in a cloud. Determining the skin type parameter and storing the skin type parameter to data storage or to gather the skin type parameter in a user profile may be performed once, for example, when the method for providing a skin surface condition information is carried out by the user for the first time. When a skin surface condition information shall be provided, the stored skin type parameter may be retrieved as first radiation measurement or in addition to receiving the first radiation measurement. Alternatively, the skin type parameter may be determined again any time a sun bathing parameter shall be provided.

In some embodiments the first radiation measurement may correspond to a radiation reflected from a location on a user's skin before or after applying sun cream to a surrounding area of the user's skin surrounding the location on the user's skin, the second radiation measurement may correspond to ambient radiation and the skin surface condition information may be a time period, a required sun protection factor and/or a required amount of a sun cream and/or an invitation to stop sunbathing. The radiation reflected from a location on a user's skin and the ambient radiation may for example be defined as described above. The time period, the required sun protection factor and/or the required amount of the sun cream may be the time period, the required sun protection factor and/or the required amount of sun cream mentioned above.

In some embodiments the first radiation measurement may correspond to a radiation reflected from a location on a user's skin before or after applying sun cream to a surrounding area of the user's skin surrounding the location on the user's skin and the second radiation measurement may correspond to ambient radiation, wherein the radiation reflected from the first location on the user's skin and the ambient radiation may be as mentioned above. Then, determining the skin surface condition information may include determining a skin type parameter of the user and determining a time period. The time period may be for example a time period, for which the user may expose his skin to the ambient light without getting sunburn. The skin type parameter may be determined by comparing the first radiation measurement to a reference radiation measurement or by choosing the skin type parameter from a skin type parameter data model as explained above. The time period may be determined for instance by choosing the time period corresponding to the determined skin type parameter and the second radiation measurement from a time period data model, for example a time period table, indicating for various skin type parameters and for various second radiation measurements a corresponding time period.

In some embodiments the first radiation measurement may correspond to a radiation reflected from a location on a user's skin before or after applying sun cream to a surrounding area of the user's skin surrounding the location on the user's skin and the second radiation measurement may correspond to an ambient radiation, wherein the radiation reflected from the first location on the user's skin and the ambient radiation may be as mentioned above. Then, the method for providing a skin surface condition information may include repeatedly receiving the second radiation measurement and determining the skin surface condition information may include determining a radiation dose threshold based on the first radiation measurement, repeatedly accumulating the received second radiation measurements to obtain a radiation dose value, repeatedly comparing the obtained radiation dose value to the radiation dose threshold and generating a user information to stop sunbathing, when the radiation dose value exceeds the radiation dose threshold. For repeatedly receiving the second radiation measurement, the second radiation measurements may be repeatedly received for example in real time from a sensor, which detects the ambient radiation. Determining the radiation dose threshold may include choosing the radiation dose threshold corresponding to the first radiation measurement from a radiation dose threshold data model stored in a data storage, for example from a radiation dose threshold table, indicating for various first radiation measurements a corresponding radiation dose threshold. Determining the radiation dose threshold may alternatively include choosing the radiation dose threshold corresponding to a skin type parameter determined as described above based on the first radiation measurement from a radiation dose threshold data model stored in a data storage, for example from a radiation dose threshold table, indicating for various skin type parameters a corresponding radiation dose threshold. Alternatively, determining the radiation dose threshold may include comparing the first radiation measurement to a reference radiation measurement, for example subtracting the first radiation measurement from the reference radiation measurement, and deriving the radiation dose threshold from the result of subtraction. Repeatedly accumulating the received second radiation measurements to obtain a radiation dose value may include repeatedly forming an integral over the second radiation measurements. Determining the skin surface condition information may further include recognizing when the radiation dose value exceeds the radiation dose threshold. In response to a positive result of recognizing the user information to stop sunbathing may be generated.

In some embodiments the first radiation measurement may correspond to a radiation reflected from a first location on a user's skin, wherein e.g. no sun cream is applied to a surrounding area of the user's skin surrounding the first location, the first radiation measurement preferably being stored in advance, e.g. in a data storage, in particular as part of a user profile, the second radiation measurement may correspond to a radiation reflected from a second location on the user's skin within the surrounding area, wherein it is e.g. not known, whether sun cream is applied, to the second location, the second radiation measurement preferably being sensed in real time and the skin surface condition information may be information, whether sun cream is applied to the second location of the user's skin. For determining, whether sun cream is applied, at two predetermined wavelengths a respective radiation value may be extracted from the first radiation measurement and at the two predetermined wavelengths a respective radiation value may be extracted from the second radiation measurement. The radiation values extracted from the first radiation measurement may be related to each other, the radiation values extracted from the second radiation measurement may be related to each other and the results thereof may be compared. Alternatively, for determining, whether sun cream is applied, at two predetermined wavelengths a respective reflectance value may be extracted from the first radiation measurement and at the two predetermined wavelengths a respective reflectance value may be extracted from the second radiation measurement. The reflectance values extracted from the first radiation measurement may be related to each other, the reflectance values extracted from the second radiation measurement may be related to each other and the results thereof may be compared. Extracting the reflectance value from the first radiation measurement and/or the second radiation measurement may include comparing the first radiation measurement and/or the second radiation measurement to a reference radiation measurement, e.g. deriving a reflectance curve, and extracting the reflectance values from the results thereof. The reference radiation measurement may be a defined radiation spectrum of an artificial light source assigned to a sensor for detecting the first radiation measurement and the second radiation measurement, wherein the artificial light source may be configured as described above.

Alternatively, determining, whether sun cream is applied, may include determining a skin type parameter of the user and determining, whether sun cream is applied, based on the determined skin type parameter and the second radiation measurement. The skin type parameter may be determined as described above. In some embodiments the first radiation measurement may correspond to a radiation reflected from a first location on a user's skin, wherein no sun cream is applied to a surrounding area of the user's skin surrounding the first location, the second radiation measurement may correspond to a radiation reflected from a second location on the user's skin within the surrounding area after applying sun cream to the surrounding area and the skin surface condition information may be a filter type of the applied sun cream, an actual sun protection factor and/or an actual amount of sun cream, for example the sun protection factor and/or the amount of the sun cream currently applied to the user's skin.

For instance, the second radiation measurement may correspond to a radiation detected shortly after the user applied the sun cream to the surrounding area surrounding the first location and the second location. The first radiation measurement may correspond to a radiation detected shortly before the user applied sun cream to the surrounding area. Alternatively, the first radiation may be a first radiation measurement, stored in data storage or stored in a user profile on a server as mentioned above. "Shortly before" and "shortly after" may be understood as "within a period of 10 min or less before/after", for example "within a period of about 1 min before/after".

In some embodiments the first radiation measurement may correspond to a radiation reflected from a first location on a user's skin, wherein no sun cream is applied to a surrounding area of the user's skin surrounding the first location and the second radiation measurement may correspond to a radiation reflected from a second location on the user's skin within the surrounding area after applying sun cream to the surrounding area. Then, determining the skin surface condition information may include determining an actual sun protection factor, for example the actual sun protection factor of a currently applied sun cream, by comparing the first radiation measurement to a reference radiation measurement, by comparing the second radiation measurement to the reference radiation measurement and by comparing the results thereof. The reference radiation measurement may be a defined radiation spectrum of an artificial light source assigned to a sensor for detecting the first radiation measurement and the second radiation measurement, wherein the artificial light source may be configured as described above. For example, the first radiation measurement may be subtracted from the reference radiation measurement and the second radiation measurement may be subtracted from the reference radiation measurement. The results of the subtractions can then be compared.

Alternatively, determining the actual sun protection factor may include determining a skin type parameter of the user and determining the actual sun protection factor based on the determined skin type parameter and the second radiation measurement. The skin type parameter may be determined as described above. The actual sun protection factor may then be determined by choosing the actual sun protection factor corresponding to the determined skin type parameter and the second radiation measurement from an actual sun protection factor data model, for example an actual sun protection factor table, indicating for various skin type parameters and for various second radiation measurements a corresponding actual sun protection factor.

In a comparable way as the actual sun protection factor, an actual amount of sun cream, for example an actual amount of currently applied sun cream, and/or a filter type of the applied sun cream may be determined.

In some embodiments the first radiation measurement may correspond to a radiation reflected from a first location on a user's skin, wherein no sun cream is applied to a surrounding area of the user's skin surrounding the first location, the second radiation measurement may correspond to a radiation reflected from a second location on the user's skin within the surrounding area after applying sun cream to the surrounding area and determining the skin surface condition information may include extracting at two predetermined wavelengths a respective reflectance value from the first radiation measurement, extracting at the two predetermined wavelengths a respective reflectance value from the second radiation measurement, relating the reflectance values extracted from the first radiation measurement to each other, relating the reflectance values extracted from the second radiation measurement to each other and comparing the results thereof to determine a filter type of the applied sun cream. Extracting the reflectance value from the first radiation measurement and/or the second radiation measurement may include comparing the first radiation measurement and/or the second radiation measurement to a reference radiation measurement, e.g. deriving a reflectance curve, and extracting the reflectance values from the results thereof. The reference radiation measurement may be a defined radiation spectrum of an artificial light source assigned to a sensor for detecting the first radiation measurement and the second radiation measurement, wherein the artificial light source may be configured as described above. Alternatively, determining the skin surface condition information may include extracting at two predetermined wavelengths a respective radiation value from the first radiation measurement, extracting at the two predetermined wavelengths a respective radiation value from the second radiation measurement, relating the radiation values extracted from the first radiation measurement to each other, relating the radiation values extracted from the second radiation measurement to each other and comparing the results thereof to determine a filter type of the applied sun cream.

In some embodiments the method for providing a skin surface condition information may further include receiving a third radiation measurement. Then, the first radiation measurement may correspond to a radiation reflected from a first location on a user's skin before applying sun cream to a surrounding area of the user's skin surrounding the first location, the second radiation measurement may correspond to a radiation reflected from a second location on the user's skin within the surrounding area after applying sun cream to the surrounding area, the third radiation measurement may correspond to an ambient radiation and the skin surface condition information may be a time period, a required sun protection factor and/or a required amount of sun cream and/or a user information to stop sunbathing. Determining the skin surface condition information may then be further based on the third radiation measurement. As already mentioned above, ambient radiation may comprise solar radiation on a sunny day and/or on a cloudy day, for example a UV-radiation, and may be received for example in real time from a sensor, which detects the ambient radiation.

In some embodiments the method for providing a skin surface condition information may further include receiving a third radiation measurement. Then the first radiation measurement may correspond to a radiation reflected from a first location on a user's skin before applying sun cream to a surrounding area of the user's skin surrounding the first location, the second radiation measurement may correspond to a radiation reflected from a second location on the user's skin within the surrounding area after applying sun cream to the surrounding area and the third radiation measurement may correspond to ambient radiation. Determining the skin surface condition information may then for example include determining a skin type parameter of the user based on the first radiation measurement, determining an actual sun protection factor based on the first radiation measurement and the second radiation measurement and determining a time period based on the determined skin type parameter, the determined actual sun protection factor and the received third radiation measurement by choosing the time period corresponding to the skin type parameter, the actual sun protection factor and the third radiation measurement from a time period data model indicating for various skin type parameters, for various sun protection factors and for various ranges of third radiation measurements a corresponding time period. Determining the skin type parameter may be performed as described above. Determining an actual sun protection factor may include comparing the first radiation measurement to a reference radiation measurement, comparing the second radiation measurement to the reference radiation measurement and comparing the results thereof.

Alternatively, determining the skin surface condition information may then for example include determining a skin type parameter of the user based on the first radiation measurement, determining an actual sun protection factor based on the determined skin type parameter and the second radiation measurement and determining the time period by choosing the time period corresponding to the determined skin type parameter, the determined actual sun protection factor and the third radiation from a time period data model indicating for various skin type parameters, for various sun protection factors and for various third radiation measurements a corresponding time period. Determining the skin type parameter and determining the actual sun protection factor may be performed as described above.

In some embodiments the method for providing a skin surface condition information may further include repeatedly receiving a third radiation measurement. The first radiation measurement may correspond to a radiation reflected from a first location on a user's skin before applying sun cream to a surrounding area of the user's skin surrounding the first location, the second radiation measurement may correspond to a radiation reflected from a second location on the user's skin within the surrounding area after applying sun cream to the surrounding area and the third radiation measurement may correspond to ambient radiation. Then, determining the skin surface condition information may include determining a skin type parameter of the user, determining an actual sun protection factor, determining a radiation dose threshold based on the skin type parameter and the sun protection factor, repeatedly accumulating the received third radiation measurements to obtain a radiation dose value, repeatedly comparing the obtained radiation dose value to the radiation dose threshold and generating a user information to stop sunbathing, when the radiation dose exceeds the radiation dose threshold. Determining a skin type parameter of the user may be based on the first radiation measurement and may be performed as described in detail above. Determining the actual sun protection factor may be based on the first radiation measurement and the second radiation measurement or on the determined skin detection parameter and the second radiation measurement and may be performed as described above. Determining a radiation dose threshold may include choosing the radiation dose threshold corresponding to the first radiation measurement and the second radiation measurement from a radiation dose threshold data model stored in a data storage, for example from a radiation dose threshold table, indicating for various first radiation measurements and for various second radiation measurements a corresponding radiation dose threshold. Determining a radiation dose threshold may alternatively include choosing the radiation dose threshold corresponding to the determined skin type parameter and the second radiation measurement from a radiation dose threshold data model stored in a data storage, for example from a radiation dose threshold table, indicating for various skin type parameters and for various second radiation measurements a corresponding radiation dose threshold. Alternatively, determining the radiation dose threshold may include comparing the first radiation measurement to a reference radiation measurement, for example subtracting the first radiation measurement from the reference radiation measurement, and deriving the radiation dose threshold from the result of subtraction. Repeatedly accumulating the received second radiation measurements to obtain a radiation dose value may include repeatedly forming an integral over the second radiation measurements. Determining the skin surface condition information may further include recognizing when the radiation dose value exceeds the radiation dose threshold. In response to a positive result of recognizing the user information to stop sunbathing may be generated.

In some embodiments the method for providing a skin surface condition information may include receiving two or more first radiation measurements each corresponding to a radiation reflected from different locations on a user's skin before or after applying sun cream to one or more surrounding areas of the user's skin surrounding the different locations on the user's skin and choosing the first radiation measurement of the two or more first radiation measurements which indicates the most sun sensitive location of the different locations. Then, determining the skin surface condition information is based on the chosen first radiation measurement. The first radiation measurements may correspond to radiations reflected from different locations on a user's arm or on another body part of the user before or after applying sun cream to the user's arm or the other body part. Alternatively or in addition, the first radiation measurements may correspond to radiations reflected from a location on the user's arm, a location on the user's back, a location in the user's face, a location on a user's leg, a location on a user's waist and/or a location on any other body part of the user before or after applying sun cream to these locations. Choosing the first radiation measurement of the two or more first radiation measurements which indicates the most sun sensitive location of the different locations may include analyzing the first radiation measurements with respect to a reflectance of the different locations and determining on the basis of the reflectance the first radiation measurement indicating the most sun sensitive location of the different locations. As for example the skin on the user's back is very sensitive to sun radiation, since it is rarely exposed to sun radiation, the user can be effectively protected, when the skin surface condition information is based on the first radiation measurement corresponding to a radiation reflected from the user's back.

In some embodiments the method for providing a skin surface condition information may further include receiving two or more first radiation measurements each corresponding to a radiation reflected from different locations on a user's skin before applying sun cream to one or more surrounding areas of the user's skin surrounding the different locations on the user's skin, choosing the first radiation measurement of the two or more first radiation measurements which indicates the most sun sensitive location of the different locations, receiving two or more second radiation measurements each corresponding to a radiation reflected from different locations on the user's skin after applying sun cream to one or more surrounding areas of the user's skin surrounding the different locations on the user's skin and choosing the second radiation measurement of the two or more second radiation measurements which indicates the most sun sensitive location of the different locations. Then, determining the skin surface condition information is based on the chosen first radiation measurement and the chosen second radiation measurement. The different locations on the user's skin for which the first radiation measurements and the second radiation measurements are received may vary. The chosen first radiation measurement may correspond to a location, which differs from the location to which the chosen radiation measurement corresponds.

In some embodiments the first radiation measurement may correspond to a first radiation value having a first wavelength reflected from a location on a user's skin, the second radiation measurement may correspond to a second radiation value having a second wavelength reflected from the location on the user's skin and determining the skin surface condition information may include determining information, whether sun cream is applied, a filter type of the applied sun cream, an actual sun protection factor and/or an actual amount of sun cream based on a relation between the first radiation measurement and the second radiation measurement. For both, the first radiation measurement and the second radiation measurement the location on the user's skin is either applied with sun cream or not. For determining the skin surface condition information, the first radiation value and the second radiation value may be related to each other. On the basis of the result thereof, the sun bathing parameter may be determined, e.g. by using a corresponding data model indicating for different results an associated skin surface condition information. Alternatively, for determining the skin surface condition information, a reflectance value may be derived from each of the first radiation measurement and the second radiation measurement and the reflectance values may be related to each other. On the basis of the result thereof, the sun bathing parameter may be determined, e.g. by using a corresponding data model indicating for different results an associated skin surface condition information.

In some embodiments sun cream may be applied to the location on the user's skin and determining the skin surface condition information may include determining a filter type of the applied sun cream by relating the first radiation measurement, e.g. the first radiation value having the first wavelength, to the second radiation measurement, e.g. the second radiation value having the second wavelength, and comparing the relation result thereof to a reference relation. Relating the first radiation measurement to the second radiation measurement may include relating the radiation values to each other. On the basis of the result thereof, the filter type may be determined, e.g. by using a filter type data model indicating for different results an associated filter type. Alternatively, relating the first radiation measurement to the second radiation measurement may include deriving a reflectance value from each of the first radiation measurement and the second radiation measurement and relating the reflectance values to each other. On the basis of the result thereof, the filter type may be determined, e.g. by using a filter type data model indicating for different results an associated filter type.

In a comparable way as the filter type of the applied sun cream an actual sun protection factor or an actual amount of sun cream may be determined.

Alternatively, no sun cream may be applied to the location on the user's skin and the method further may include receiving a third radiation measurement corresponding to a third radiation value having the first wavelength reflected from a further location on a user's skin, wherein it is not known, whether sun cream is applied to the further location, and receiving a fourth radiation measurement corresponding to a fourth radiation value having the second wavelength reflected from the further location on the user's skin and determining the skin surface condition information may include determining information, whether sun cream is applied, by relating the third radiation measurement, e.g. the third radiation value having the first wavelength, reflected from the location to the fourth radiation measurement, e.g. the fourth radiation value having the second wavelength, reflected from the location, relating the third radiation measurement to the fourth radiation measurement and comparing the relation results thereof. Relating the third radiation measurement to the fourth radiation measurement may be performed as described above for determining the filter type.

In some embodiments receiving the first radiation measurement and the second radiation measurement includes receiving the first radiation measurement and the second radiation measurement from a sensor arrangement. The sensor arrangement may include a sensor, for example a spectral sensor or a camera, which may be provided with an optical filter, configured to detect the radiation reflected from a location on the user's skin, for instance from the first location and the second location. For example, the sensor arrangement may further include an artificial light source assigned to the sensor, wherein the artificial light source emits radiation, which is reflected from the location of the user's skin. The sensor may be configured to detect also ambient radiation and/or the sensor arrangement may include an additional sensor configured to detect ambient radiation. The sensor arrangement will be described in detail below. Then, the method for providing a skin surface condition information may include generating a first user message indicating a first invitation to the user to position the sensor arrangement so that the sensor arrangement detects a radiation reflected from a first location on a user's skin before applying sun cream to a surrounding area of the user's skin surrounding the first location and providing the first invitation to a user interface. In addition or alternatively, a second user message indicating a second invitation to the user to position the sensor arrangement so that the sensor arrangement detects a radiation reflected from a second location on the user's skin before applying sun cream to the surrounding area of the user's skin surrounding the second location may be generated and provided to the user interface. In addition or alternatively, a third user message indicating a third invitation to the user to position the sensor arrangement so that the sensor arrangement detects ambient radiation is generated and provided to the user interface.

When radiation reflected from a first location or the second location on a user's skin shall be detected, the sensor may be positioned so that only light emitted from the artificial light source is reflected from the first location and the second location on the user's skin. For example, an electronic device including the sensor arrangement may be in contact with the user's skin. Alternatively, interfering light may be removed using background separation.

In some embodiments the method for providing a skin surface condition information may include receiving environmental information and/or health information, wherein the skin surface condition information is determined further based on the environmental information and/or health information. The environmental information may be time of day, date of year, location, for example a GPS location, a weather forecast, a measured outdoor temperature and/or a measured humidity. The health information may be a body temperature and/or a heartbeat. The environmental information and/or health information may be considered when determining the time period, for example in a time period data model, or when a required sun protection factor and/or a required amount of a sun cream are determined. Thus, the skin surface condition information, for instance the time period and the required sun protection factor and/or the required amount of the sun cream may be extrapolated on the basis of the environmental information and/or health information.

In some embodiments, the method for providing a skin surface condition information may include generating user information indicting the determined skin surface condition information to the user or to a third party. The user information can be provided to a user interface. The user interface may be an optical user interface, an acoustical user interface and/or a tactile user interface and will be described in detail below. For example, the user information may be a blinking light or a sound provided to the user via the user interface. The user information may in addition or alternatively be provided to a communication interface. The communication interface may be a wireless interface, e.g. a Bluetooth 4.0 interface.

In some embodiments radiation measurements may be received from sensors located in personal devices. For example a first, second and/or third radiation measurement may be received from a sensor located in a personal device of a first user. Based on the radiation measurements received from the personal device, a main device may provide a skin surface condition information concerning the first user to a third party. Furthermore, radiation measurements may be received from a sensor located in a personal device of a second user, based on which the main device may provide a skin surface condition information concerning the second user to the third party. Alternatively, the skin surface condition information may be provided by personal devices to a main device for allowing a third party to monitor the skin surface condition information concerning the users of the personal devices. In both cases a third party, for instance a person responsible for several other persons, for example a parent or an educator, is enabled to monitor the other persons, for example children, and to be informed, when the risk increases that one or more of these other persons get sunburn.

The method for providing a skin surface condition information may be implemented as software, for example as an app for a smart phone or a smart watch.

An electronic device includes a processor configured to carry out a method for providing a skin surface condition information including receiving a first radiation measurement and a second radiation measurement and determining a skin surface condition information based on the first radiation measurement and the second radiation measurement.

With respect to the first radiation measurement, the second radiation measurement and the sun bathing parameter it is referred to their detailed description cited during explanation of the method for providing a skin surface condition information above.

For example, the processor of the electronic device may be configured to perform any one of the methods for providing a skin surface condition information described above.

In some embodiments, the electronic device may include a sensor arrangement configured to detect the first radiation measurement and/or to detect the second radiation measurement and to provide the first radiation measurement and/or the second radiation measurement to the processor.

For example, the sensor arrangement may include at least one camera arrangement including a camera and an optical filter arranged in front of a camera opening, wherein the optical filter is transmissive only for light having a predetermined wavelength and a sensor light source. E.g. the sensor arrangement may include a first camera arrangement including a first camera and a first optical filter arranged in front of a camera opening of the first camera, wherein the first optical filter is transmissive only for light having a wavelength in the range of 380 nm to 390 nm, e.g. of about 385 nm, a second camera arrangement including a second camera and a second optical filter arranged in front of a camera opening of the second camera, wherein the second optical filter is transmissive only for light having a wavelength of about 400 nm or in the range of 410 nm to 430 nm, e.g. of about 420 nm, and the sensor light source. The sensor arrangement may include further camera arrangements configured correspondingly.

In some embodiments, the electronic device may include a storage configured to store the first radiation measurement and/or the second radiation measurement and to provide the first radiation measurement and/or the second radiation measurement to the processor.

In some embodiments the sensor arrangement may include at least one spectral sensor and/or an artificial light source. The sensor arrangement may include a sensor, for example a spectral sensor, configured to detect the radiation reflected from a location on the user's skin, for instance from the first location and the second location. For example, the sensor arrangement may further include an artificial light source assigned to the sensor, wherein the artificial light source emits radiation, which is reflected from the location of the user's skin. The artificial light source may be arranged in the vicinity of the sensor configured to detect radiation reflected from the location of the user's skin. The artificial light source may be configured to output a continuous spectrum, for example in a predetermined spectral range, for instance the artificial light source may be a day light lamp, a flashlight or an aggregation of LEDs. The sensor may be further configured to detect also ambient radiation, for example UV-radiation, and/or the sensor arrangement may include one or more additional sensors configured to detect ambient light. If the sensor arrangement includes a separate sensor for detecting the radiation reflected from the location on the user's skin and a separate additional sensor for detecting the ambient radiation, the sensors may be located on different sides of the electronic device, for example on opposite sides of the electronic device. This allows detecting the radiation reflected from the location on the user's skin and the ambient radiation simultaneously.

In some embodiments the electronic device may include a user interface and/or a communication interface. The user interface may be an optical user interface, an acoustical user interface and/or a tactile user interface. The optical user interface may include a display screen and/or one or more light sources emitting visible light, for example one or more LEDs. The acoustical user interface may include a loudspeaker and/or the tactile user interface may include a vibration generator. The communication interface may be a wireless communication interface, for example a Bluetooth 4.0 interface. Then, the processor may be configured to generate a first user message indicating an invitation to the user to position the electronic device so that the sensor arrangement detects a radiation reflected from a first location on a user's skin before applying sun cream to a surrounding area of the user's skin surrounding the first location and/or to generate a second user message indicating an invitation to the user to position the electronic device so that the sensor arrangement detects a radiation reflected from a second location on the user's skin after applying sun cream to the surrounding area of the user's skin surrounding the second location and/or to generate a third user message indicating an invitation to the user to position the electronic device so that the sensor arrangement detects ambient radiation and/or to generate a user information indicating the determined skin surface condition information to the user and/or to a third party. The processor may then further be configured to provide the first user message, the second user message, the third user message and/or the user information to the user interface, wherein the user interface is configured to output the corresponding invitations and information to the user. Additionally or alternatively the processor may then further be configured to provide the user information to the communication interface. The communication interface may be configured to provide the user information to a main device of a third party for outputting the user information to the third party, for example a parent. The third party may thus be informed when the user of the electronic device, for example a child, shall get off the sun in order to avoid getting sunburn.

In some embodiments the electronic device may be one selected from a smart phone, a tablet computer, a portable game console, a smart watch, an electronic wristband, an electronic leg band, electronic glasses (smart glasses), an e-book reader or a mobile digital media player. Alternatively, the electronic device may be designed as electronic ear ring, as electronic ring, as electronic necklace, as electronic necklace hanger and/or as electronic key ring pendant.

The electronic device may be waterproof and/or heatproof. Thus, the electronic device may be used under extreme surrounding conditions such as in intensive radiation. The electronic device may be solar powered and may be provided with solar cells. For example, an electronic device formed as electronic wristband may be provided at sides oriented away from the user's skin with solar cell elements. Alternatively or additionally, the electronic device may include a battery and/or an accumulator as energy source.

In some embodiments the electronic device may include a communication interface configured to receive radiation measurements from sensors located in personal devices. The electronic device may then be a main device, for example a smart phone or a tablet computer or the like, configured to provide sun bathing parameters of different users, for example of children, carrying personal sensor devices to a third party, for example a parent. In this case, the personal sensor devices may be any device provided with a sensor arrangement and a communication interface, for example an electronic wristband, an electronic leg band, electronic glasses or the like.

The electronic device may further have an outdoor temperature sensor, a body temperature sensor, a humidity sensor, a heart beat monitor and/or the like for receiving environmental information and/or health information. This information may influence determination of the skin surface condition information and/or may provide additional information to the skin surface condition information.

A system of electronic devices may include an electronic device, for example a main device, including a processor configured to carry out a method for providing a skin surface condition information including receiving a first radiation measurement, receiving a second radiation measurement and determining a skin surface condition information based on the first radiation measurement and the second radiation measurement, and several personal devices, wherein radiation measurements are received from sensors located in the personal devices.

Another system of electronic devices may include a main device and several personal devices each including a processor configured to carry out a method for providing a skin surface condition information including receiving a first radiation measurement, receiving a second radiation measurement and determining a skin surface condition information based on the first radiation measurement and the second radiation measurement, wherein the sun bathing parameters are provided from the personal devices to the main device.

Both systems allow a third party, for instance a parent or an educator, using the main device to be enabled to monitor other persons, for example children, carrying the personal devices and to be informed, when the risk increases that one or more of these other persons gets sunburn.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Embodiments are now described with reference to the drawings.

FIG. 1 schematically illustrates an embodiment of an electronic device in form of a smart phone 11 configured to provide a user with a skin surface condition information. The smart phone 11 includes a housing 110 having a front side shown by the left illustration and a back side shown by the right illustration of FIG. 1. The housing 110 holds on its front side a display screen 111, which outputs information to a user, for example by presenting icons 1110 on the display screen 111. On the back side, the housing 110 holds a camera 112 and a sensor arrangement 2. The sensor arrangement 2 includes a sensor 20 and a light source 21 assigned to the sensor 20.

Figure 2A:
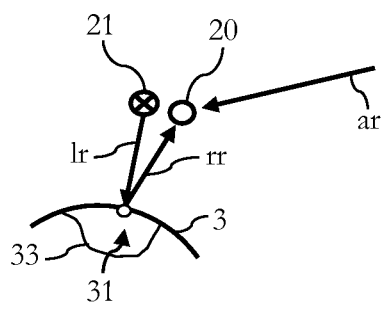
FIG. 2A schematically illustrates an example in which a sensor receives radiation reflected from skin without sun cream and ambient radiation.

FIG. 2A schematically illustrates an example in which a sensor 20 receives radiation rr reflected from a user's skin 3 without sun cream and ambient radiation ar from the sun. In this example, a light source 21, assigned to the sensor 20 and the sensor 20 are located in the vicinity of a user's skin 3. The light source 21 emits a radiation lr having a defined continuous radiation spectrum towards a first location 31 in a surrounding area 33, to which no sun cream is applied. The sensor 20 detects the radiation rr reflected from the first location 31. The sensor 20 can be relocated and detect UV-radiation of sun light.

Figure 2B:
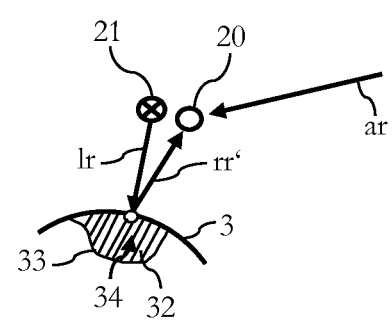
FIG. 2B schematically illustrates an example in which the sensor receives radiation reflected from skin provided with sun cream and ambient radiation.

FIG. 2B schematically illustrates an example in which the sensor 20 receives radiation rr' reflected from the user's skin provided with sun cream and ambient radiation. The light source 21 and the sensor 20 are again located in the vicinity of the user's skin 3. The light source 21 emits the radiation lr having a defined continuous radiation spectrum towards a second location 34 in the surrounding area 33 surrounding the first location 31, wherein sun cream 32 is applied to the second location 34 and the surrounding area 33. The sensor 20 detects the radiation rr' reflected from the second location 34. The sensor 20 can be relocated and detect UV-radiation of sun light.

FIG. 3 schematically illustrates a method 4 for providing a skin type parameter. At 40 a user message is generated indicating on a display screen an invitation to a user to position a sensor to a first location of a user's skin, where no sun cream is applied. At 41, it is recognized that the sensor is positioned to the first location. Recognizing that the sensor is positioned to the first location includes receiving a predetermined user input such as pressing a predetermined button. Alternatively, radiation measurement data detected before the generation of the user message indicating on the display screen the invitation to the user to position the sensor to the first location of the user's skin, where no sun cream is applied, is received and radiation measurement data detected after generation of this user message are compared and, when a substantial change in intensity is detected, it is determined that the sensor is positioned to the first location. At 42 a radiation spectrum of the radiation reflected from the first position on the user's skin without sun cream is received. At 43 the skin type parameter of the user based on the radiation spectrum of the user's skin without sun cream is determined. This is explained in detail with reference to FIG. 4 below.

FIG. 4 schematically illustrates an example of determining 43 the skin type parameter based on the radiation spectrum of the user's skin without sun cream. At 50 a defined radiation spectrum of a sensor light source assigned to the sensor is retrieved from data storage. At 51 the radiation spectrum of the user's skin without sun cream is provided. At 52 the radiation spectrum of the user's skin without sun cream is subtracted from the defined radiation spectrum of the sensor light source and the sun bathing parameter is derived on the basis of the result of subtraction. At 53 the determined skin type parameter is provided.

Figure 5:
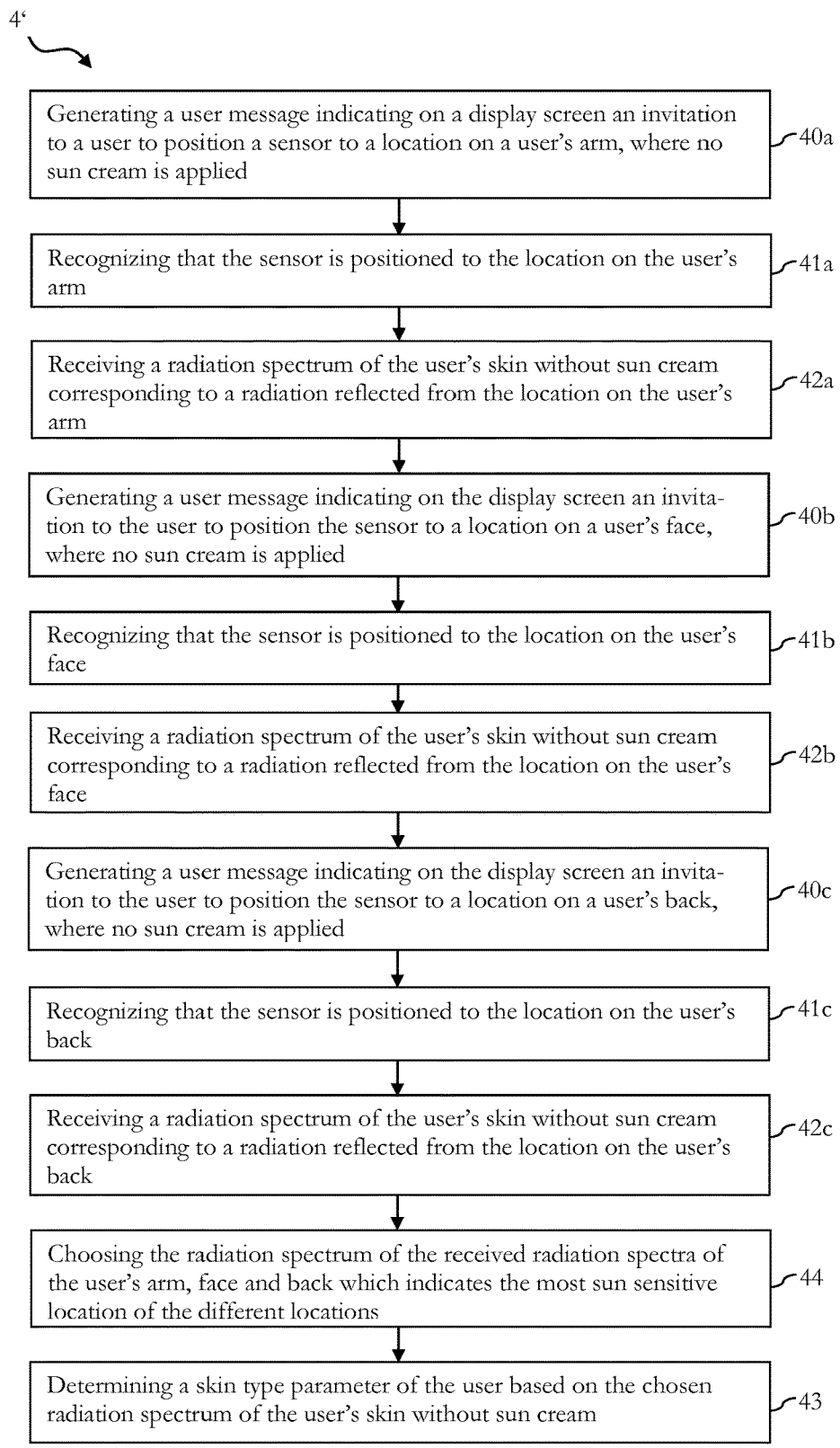
FIG. 5 schematically illustrates another method for providing a skin type parameter.

FIG. 5 schematically illustrates a further method 4' for providing a skin type parameter. At 40a a user message is generated indicating on a display screen an invitation to a user to position a sensor to a location on a user's arm, where no sun cream is applied. At 41a, it is recognized that the sensor is positioned to the location on the user's arm. At 42a a radiation spectrum of the radiation reflected from the position on the user's arm without sun cream is received. At 40b a user message is generated indicating on the display screen an invitation to a user to position the sensor to a location on a user's face, where no sun cream is applied. At 41b, it is recognized that the sensor is positioned to the location on the user's face. At 42b a radiation spectrum of the radiation reflected from the position on the user's face without sun cream is received. At 40c a user message is generated indicating on the display screen an invitation to a user to position the sensor to a location on a user's back, where no sun cream is applied. At 41c, it is recognized that the sensor is positioned to the location on the user's back. At 42c a radiation spectrum of the radiation reflected from the position on the user's back without sun cream is received. Recognizing that the sensor is positioned to the location on the user's arm, on the user's face or on the user's back is performed as explained with respect to FIG. 3. At 44 the radiation spectrum of the received radiation spectra of the user's arm, face and back which indicates the most sun sensitive location of the different locations is chosen. Therefore, the radiation spectra are analyzed with respect to a reflectance of the different locations and the radiation spectrum with the highest reflectance is determined as corresponding to the most sun sensitive location of the different locations. At 43 the skin type parameter of the user based on the chosen radiation spectrum of the user's skin without sun cream is determined in the way previously explained with reference to FIG. 4.

Figures 6, 7:
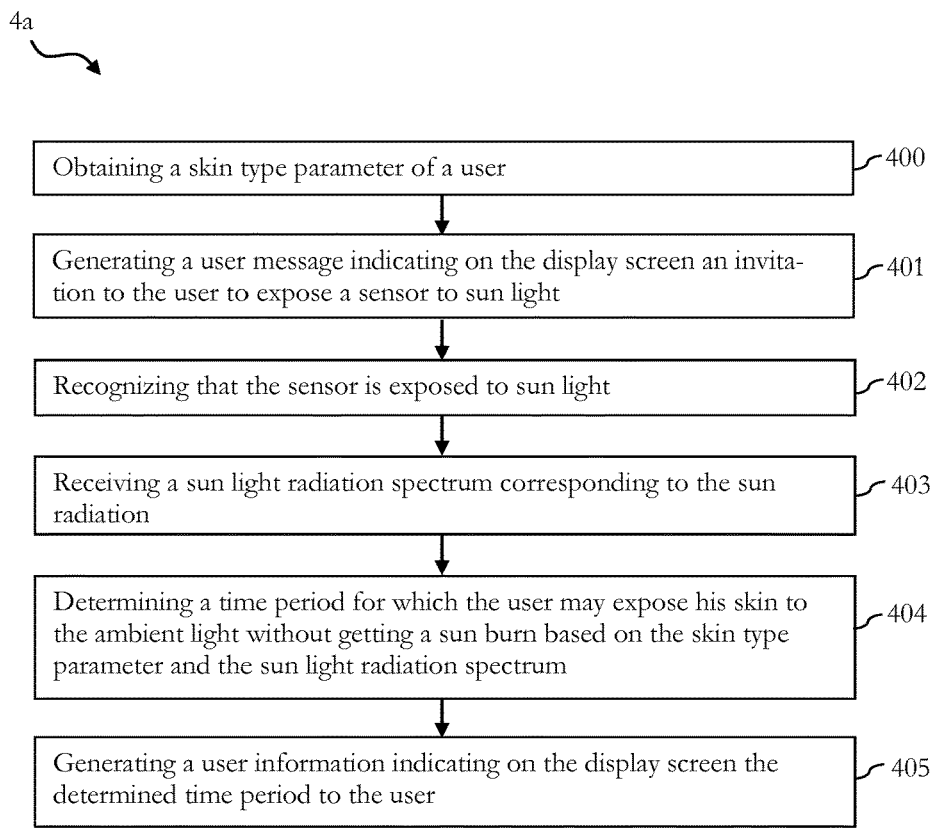
FIG. 6 schematically illustrates a method for providing a time period, for which a user may expose his skin to sun light without getting sunburn.
FIG. 7 schematically illustrates an example of determining the time period, for which a user may expose his skin to sun light without getting sunburn, while providing this time period according to FIG. 6.

FIG. 6 schematically illustrates a method 4a for providing a time period, for which a user may expose his skin to ambient light without getting sunburn. At 400 a skin type parameter of the user is obtained. Obtaining the skin type parameter is carried out by way of the method 4 for providing a skin type parameter described with reference to FIG. 3. Alternatively, the skin type of the user may be obtained from data storage or from a user profile stored on a server or in a cloud.

At 401 a user message is generated indicating on the display screen an invitation to the user to expose the sensor to sun light. At 402 it is recognized that the sensor is exposed to sun light. Recognizing that the sensor is exposed to sun light includes receiving a predetermined user input such as pressing a predetermined button. Alternatively, radiation measurement data detected after generation of the user message indicating on the display screen the invitation to the user to position the sensor to sun light and the radiation spectrum of the radiation reflected from the first location on the user's skin without sun cream previously received at 42 of the method described with reference to FIG. 3 may be compared and, when a substantial change in intensity is detected, it is determined that the sensor is positioned to sun light.

At 403 a sun light radiation spectrum corresponding to the sun light is received. The sun light radiation spectrum is converted into a UV-index (UVI) according to, for example, the international definition. According to this international definition the spectral radiation amount is weighted with a defined efficiency spectrum, integrated and normalized. The UVI according to the international definition is a measure of the intensity of UV-radiation from the sun that causes sunburn on human skin. The UVI can have an amount from 0 to 15 or more, wherein 0 represents a low intensity and 10 or more a high intensity. At 404 a time period, for which the user may expose his skin to the sun light without getting sunburn based on the skin type parameter and the sun light radiation spectrum is determined. This is explained in detail with reference to FIG. 7 below. At 405 user information is generated indicating on the display screen the determined time period, for which the user may expose his skin to sun light without getting a sunburn to the user.

FIG. 7 presents a table which indicates for various skin types and for various UVIs a corresponding time period, for which a user may expose his skin to sun light without getting sunburn. Determining 404 the time period, for which a user may expose his skin to sun light without getting sunburn, while providing this time period according to FIG. 6 is performed by choosing a time period corresponding to the skin type parameter and the UVI from the table of FIG. 7. This table shows in its left vertical column the UVI from 1 to >10 and in its upper horizontal row the skin type parameters light, medium and dark. In the region framed by the left vertical column and the upper horizontal row the table shows for each UVI and for each skin type parameter a corresponding time period, for which the user may expose his skin to the sun light without getting sunburn. In detail, when the received UVI is 1 or 2, a time period for which a light skinned person may expose his skin without sun cream to sun light amounts 2 hours, a time period for which a medium skinned person may expose his skin without sun cream to sun light amounts 4 hours and a time period for which a dark skinned person may expose his skin without sun cream to sun light amounts for 6 hours. When the received UVI is 3, 4 or 5, a time period for which a light skinned person may expose his skin without sun cream to sun light amounts 1 hour, a time period for which a medium skinned person may expose his skin without sun cream to sun light amounts 2 hours and a time period for which a dark skinned person may expose his skin without sun cream to sun light amounts for 4 hours. When the received UVI is 6 or 7, a time period for which a light skinned person may expose his skin without sun cream to sun light amounts 45 minutes, a time period for which a medium skinned person may expose his skin without sun cream to sun light amounts 1.5 hours and a time period for which a dark skinned person may expose his skin without sun cream to sun light amounts for 2 hours. When the received UVI is 8, 9 or 10, a time period for which a light skinned person may expose his skin without sun cream to sun light amounts 30 minutes, a time period for which a medium skinned person may expose his skin without sun cream to sun light amounts 1 hour and a time period for which a dark skinned person may expose his skin without sun cream to sun light amounts for 1.5 hours. When the received UVI is higher than 10, a time period for which a light skinned person may expose his skin without sun cream to sun light amounts 10 minutes, a time period for which a medium skinned person may expose his skin without sun cream to sun light amounts 20 minutes and a time period for which a dark skinned person may expose his skin without sun cream to sun light amounts for 30 minutes.

Figures 8, 9:
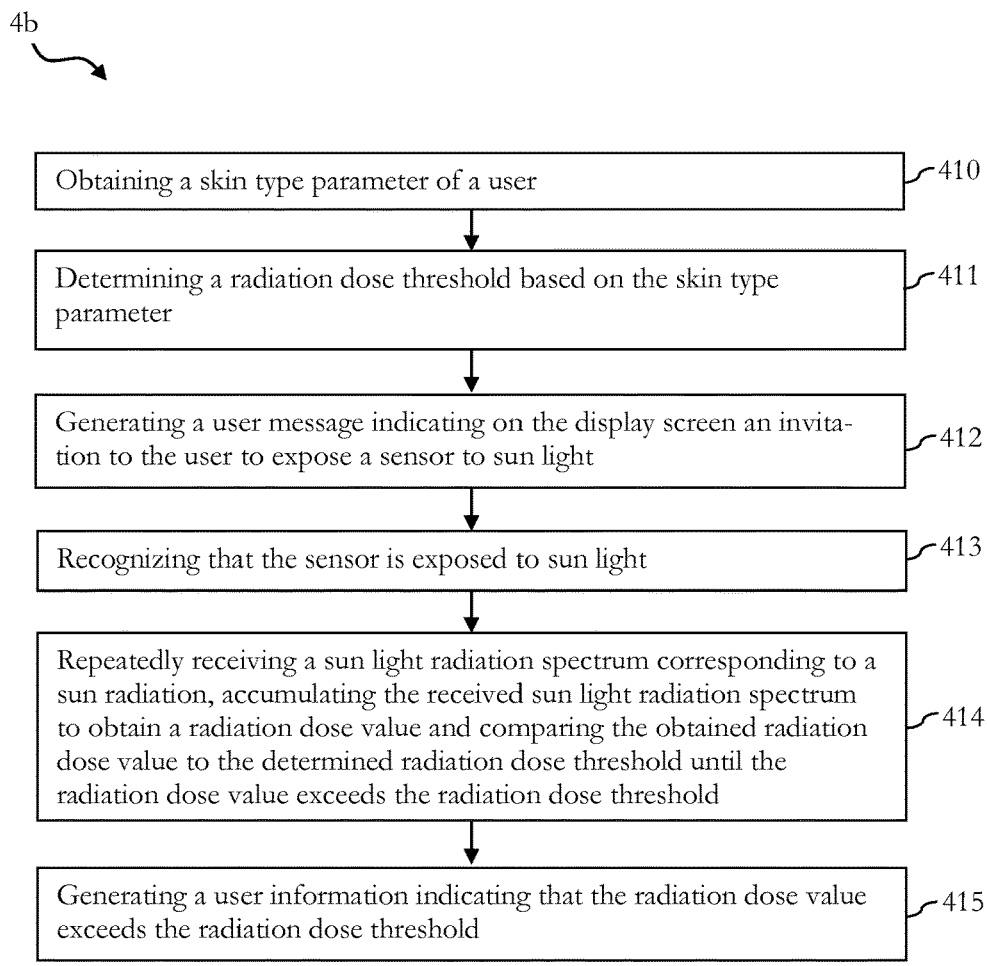
FIG. 8 schematically illustrates a method for informing a user to stop sunbathing when a radiation dose value exceeds a radiation dose threshold.
FIG. 9 schematically illustrates an example of determining a radiation dose while providing the information to stop sunbathing when a radiation dose value exceeds a radiation dose threshold according to FIG. 8.

FIG. 8 schematically illustrates a method 4b for informing a user to stop sunbathing when a radiation dose value exceeds a radiation dose threshold to avoid getting sunburn. At 410 a skin type parameter of the user is obtained. Obtaining the skin type parameter is carried out by way of the method for providing a skin type parameter described with reference to FIG. 3. Alternatively, the skin type parameter of the user may be obtained from data storage or from user profile stored on a server or in a cloud.

At 411 a radiation dose threshold is generated based on the obtained skin type parameter. This is explained in detail with reference to FIG. 9 below. At 412 a user message is generated indicating on the display screen an invitation to the user to expose a sensor to sun light. At 413 it is recognized that the sensor is exposed to sun light. Recognizing that the sensor is exposed to sun light includes receiving a predetermined user input such as pressing a predetermined button. Alternatively, radiation measurement data detected after generation of the user message indicating on the display screen the invitation to the user to position the sensor to sun light and the radiation spectrum of the radiation reflected from the first position on the user's skin without sun cream previously received at 42 of the method described with reference to FIG. 3 may be compared and, when a substantial change in intensity is detected, it is determined that the sensor is positioned to sun light.

At 414 a sun light radiation spectrum corresponding to the sun light is repeatedly received, the received sun light radiation spectrum is repeatedly accumulated to obtain a radiation dose value and the obtained radiation dose value is repeatedly compared to the determined radiation dose threshold until the radiation dose value exceeds the radiation dose threshold. This is explained in detail with reference to FIG. 10A and FIG. 10B below. At 415 user information is generated indicating that the radiation dose value exceeds the radiation dose threshold and that the user shall stop sunbathing to avoid getting a sunburn.

FIG. 9 presents a table which indicates for various skin types a corresponding radiation dose threshold. The radiation dose threshold is a threshold indicating that exposure to sun light at a radiation dose higher than the threshold, is dangerous for health. The radiation dose threshold is a minimum erythemal dose threshold (MED threshold) indicating a minimum erythemal dose (MED) which shall not be exceeded during sunbathing. The MED will be defined below with reference to FIG. 10B. Determining 411 the radiation dose threshold while informing the user to stop sunbathing when a radiation dose value exceeds a radiation dose threshold according to FIG. 8 is performed by choosing a radiation dose threshold corresponding to the skin type from the table of FIG. 9. This table shows in its left column the skin type parameters light, medium and dark and in its right column the corresponding radiation dose thresholds for skin without sun cream. In detail, the radiation dose threshold for a light skinned person without sun cream amounts 10, the radiation dose threshold for a medium skinned person without sun cream amounts 20 and the radiation dose threshold for a dark skinned person without sun cream amounts 30.

Figure 10A:
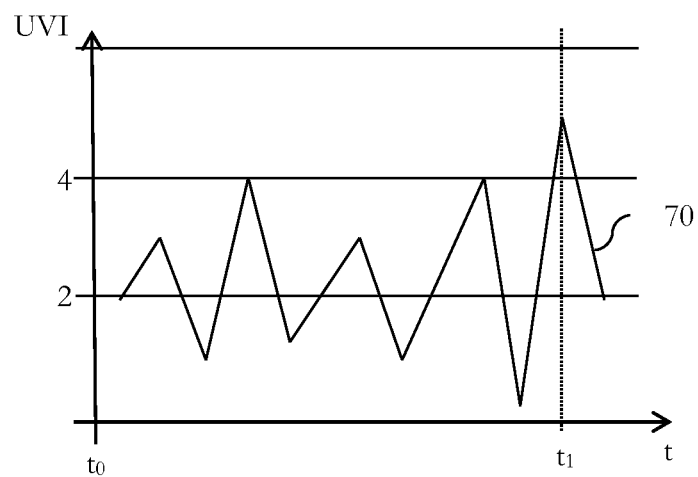
FIG. 10A schematically illustrates an example of a curve representing a time dependent intensity of sun light.

FIG. 10A schematically illustrates a diagram with a curve 70 representing variations of the UVI over time. In the diagram the time is entered on the x-axis and the UVI is entered on the y-axis. The curve 70 oscillates over time between UVI≈0 and UVI≈5. The time dependent changes of the UVI are for example caused by clouds drifting past the sun. Repeatedly receiving the sun light radiation spectrum corresponding to the sun light at 414 while informing a user to stop sunbathing when a radiation dose value exceeds the radiation dose threshold according to FIG. 8 is performed by receiving at evenly distributed time points the actual UVI value and generating at each time point a UVI curve of the UVI values received during an interval from $t_0$ to the corresponding time point. The UVI curve at each time point corresponds to an interval of curve 70 in FIG. 10A from $t_0$ to the corresponding time point.

Figure 10B:
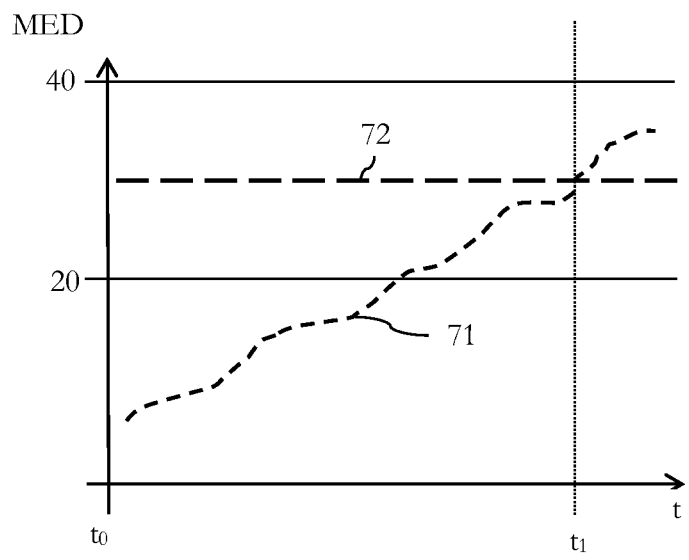
FIG. 10B schematically illustrates an example of determining that the radiation dose value exceeds the radiation dose threshold while informing a user to stop sunbathing when a radiation dose value exceeds a radiation dose threshold according to FIG. 8.

FIG. 10B schematically illustrates a diagram with a curve 71 representing the minimum erythemal dose (MED) over a period of time. In the diagram the time is entered on the x-axis and the MED is entered on the y-axis. The curve 71 representing the MED is the integral of curve 70 representing the UVI in FIG. 10A. Repeatedly accumulating 414 the received sun light radiation spectrum to obtain a radiation dose value while informing a user to stop sunbathing when a radiation dose value exceeds a radiation dose threshold according to FIG. 8 is performed by forming the integral of the UVI curves provided at each time point, at which the UVI value is received. The integral of the UVI curves at each time point corresponds to an interval of curve 71 in FIG. 10B from $t_0$ to the corresponding time point.

FIG. 10B further indicates the MED threshold 72 for a dark skinned person, which amounts 30 according to the table of FIG. 9. Repeatedly comparing the obtained radiation dose value at each time point to the determined radiation dose threshold includes determining whether the MED value at the corresponding time point is higher than the MED threshold or not.

Repeatedly receiving the sun light radiation spectrum corresponding to sun light, repeatedly accumulating the received sun light radiation spectrum to obtain a radiation dose value and repeatedly comparing the obtained radiation dose value to the determined radiation dose threshold at 414 is performed until the MED value exceeds the MED threshold. This is the case at the time point $t_1$, where the curve 71 representing the MED and the MED threshold 72 cross each other in FIG. 10B or at which the MED value equals to the MED threshold.

Figure 11:
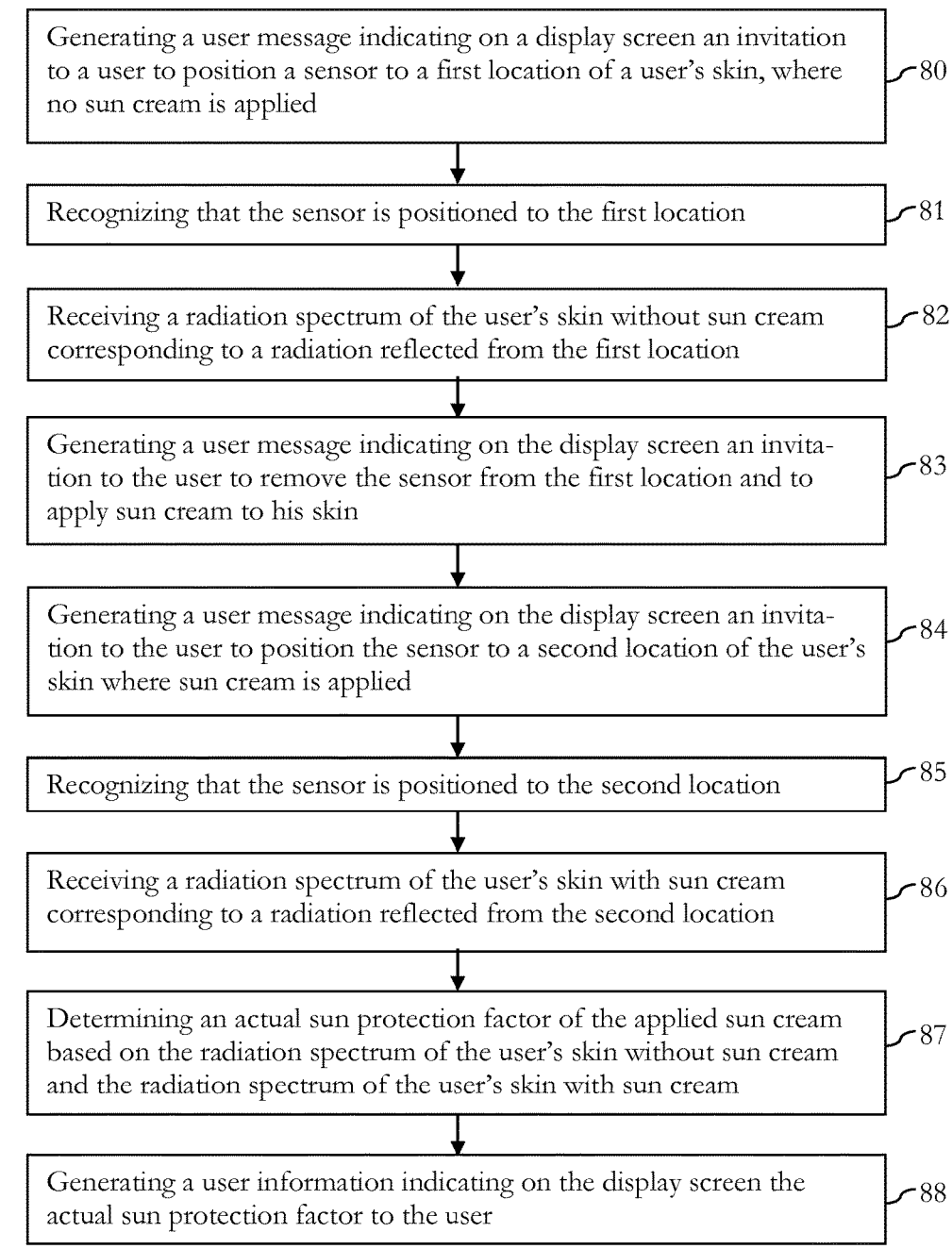
FIG. 11 schematically illustrates a method for providing an actual sun protection factor of a sun cream applied to a user's skin.

FIG. 11 schematically illustrates a method 8 for providing an actual sun protection factor of a sun cream applied to a user's skin. At 80 a user message is generated indicating on a display screen an invitation to a user to position a sensor to a first location of a user's skin, where no sun cream is applied. At 81 it is recognized that the sensor is positioned to the first location. Recognizing that the sensor is exposed to the first location includes receiving a predetermined user input such as pressing a predetermined button. Alternatively, radiation measurement data detected before the generation of the user message indicating on a display screen an invitation to a user to position the sensor to a first location of a user's skin, where no sun cream is applied, is received and radiation measurement data detected after generation of this user message are compared and, when a substantial change in intensity is detected, it is determined that the sensor is positioned to the first location.

At 82 a radiation spectrum of the user's skin without sun cream corresponding to a radiation reflected from the first location is received. At 83 a user message is generated indicating on the display screen an invitation to the user to remove the sensor from the first location and to apply sun cream to the skin. At 84 a user message is generated indicating on the display screen an invitation to the user to position the sensor to a second location of the user's skin where sun cream is applied. At 85 it is recognized that the sensor is positioned to the second location. Recognizing that the sensor is exposed to the second location includes receiving a predetermined user input such as pressing a predetermined button. Alternatively, radiation measurement data detected before the generation of the user message indicating on a display screen an invitation to a user to position the sensor to the second location of a user's skin, where sun cream is applied, is received and radiation measurement data detected after generation of this user message are compared and, when a substantial change in intensity is detected, it is determined that the sensor is positioned to the second location.

Figure 12:
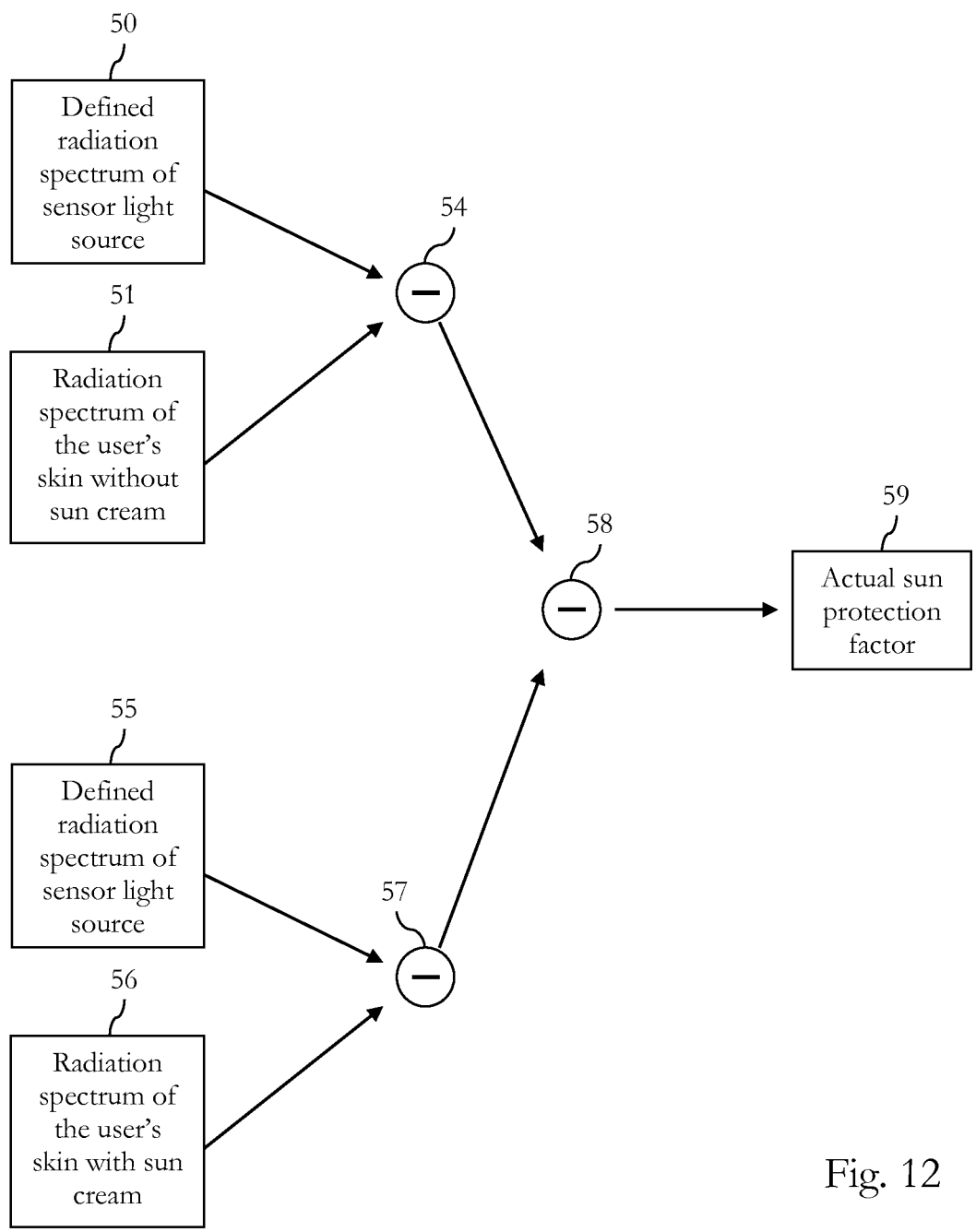
FIG. 12 schematically illustrates an example of determining the actual sun protection factor while providing the actual sun protection factor according to FIG. 11.

At 86 a radiation spectrum of the user's skin with sun cream corresponding to a radiation reflected from the second location is received. At 87 an actual sun protection factor of the applied sun cream based on the radiation spectrum of the user's skin without sun cream and the radiation spectrum of the user's skin with sun cream is determined. This is explained in detail with reference to FIG. 12 below. At 88 a user information is generated indicating on the display screen the actual sun protection factor to the user. FIG. 12 schematically illustrates an example of determining 87 the actual sun protection factor while providing the actual sun protection factor according to FIG. 11 based on the radiation spectrum of the user's skin without sun cream and the radiation spectrum of the user's skin with sun cream. At 50 a defined radiation spectrum of sensor light source is retrieved from a data storage. At 51 the radiation spectrum of the user's skin without sun cream is provided. At 54 the radiation spectrum of the user's skin without sun cream is subtracted from the defined radiation spectrum of sensor light source and the result of subtraction without sun cream is provided. At 55 the defined radiation spectrum of sensor light source is retrieved from the data storage. At 56 the radiation spectrum of the user's skin with sun cream is provided. At 57 the radiation spectrum of the user's skin with sun cream is subtracted from the defined radiation spectrum of sensor light source and the result of subtraction with sun cream is provided. At 58 the result of subtraction without sun cream is subtracted form the result of subtraction with sun cream and the actual sun protection factor of the applied sun cream is derived. At 59 the actual sun protection factor of the applied sun cream is provided. Such a determination of the actual sun protection factor is possible, since an amount of a reflectance value at characteristic wavelengths, e.g. in a wavelength range from 400 nm to 600 nm, increases with increasing sun protection factor. In addition to generating a user message indicating on a display screen an invitation to a user to position a sensor to a first location of a user's skin, where no sun cream is applied at 80, recognizing that the sensor is positioned to the first location at 81 and receiving a radiation spectrum of the user's skin without sun cream corresponding to a radiation reflected from the first location at 82 the method 8 may include generating one or more additional user messages on the display screen to the user to position the sensor to a location on the user's arm, face or back, recognizing that the sensor is positioned to the a location on the user's arm, face or back and receiving a radiation spectrum of the a location on the user's arm, face or back without sun cream corresponding to a radiation reflected from the location on the user's arm, face or back. From the received radiation spectra of the user's arm, face and back the radiation spectrum which indicates the most sun sensitive location of the different locations is chosen as described with respect to FIG. 5 above. The chosen radiation spectrum is used as radiation spectrum at 83 to 88.

Figure 13:
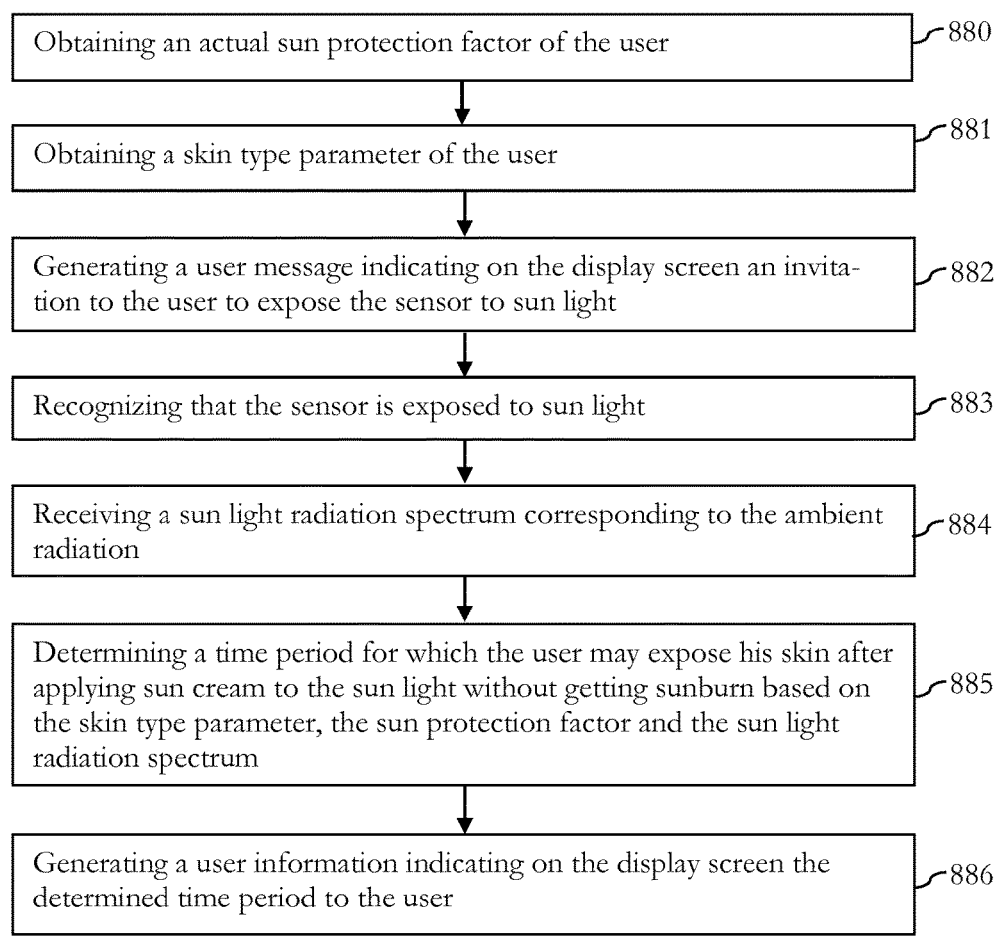
FIG. 13 schematically illustrates a method for providing a time period, for which a user may expose his skin to sun light without getting sunburn.

FIG. 13 schematically illustrates a method 88a for providing a time period for which a user may expose his skin to sun light without getting sunburn. At 880 an actual sun protection factor of the user is obtained. Obtaining the actual sun protection factor of the applied sun cream is carried out by way of the method 8 for providing an actual sun protection factor of a sun cream applied to the user's skin described with reference to FIG. 11 at 80 to 88. Alternatively, the skin type of the user may be obtained from data storage or from a user profile stored on a server or in a cloud. At 881 a skin type parameter of a user is obtained. Obtaining the skin type parameter is carried out by way of the method 4 for providing a skin type parameter described with reference to FIG. 3. Alternatively, the skin type of the user may be obtained from data storage or from a user profile stored on a server or in a cloud.

At 882 a user message is generated indicating on the display screen an invitation to the user to expose the sensor to sun light. At 883 it is recognized that the sensor is exposed to sun light. Recognizing that the sensor is positioned to the first location includes receiving a predetermined user input such as pressing a predetermined button. Alternatively, radiation measurement data detected after the generation of the user message indicating on the display screen the invitation to the user to position the sensor to sun light, is received and the radiation spectrum of the radiation reflected from the first position on the user's skin with sun cream previously received at 86 of the method described with reference to FIG. 11 may be compared and, when a substantial change in intensity is detected, it is determined that the sensor is positioned to sun light.

At 884 a sun light radiation spectrum corresponding to the sun light is received. At 885 a time period for which the user may expose his skin after applying sun cream to the sun light without getting a sunburn is determined based on the skin type parameter, the sun protection factor and the sun light radiation spectrum. This is explained in detail with reference to FIG. 14 below. At 886 user information is generated indicating on the display screen the determined time period to the user.

FIG. 14 presents a table which indicates for various skin types, for various sun protection factors of applied sun cream and for various UVIs a corresponding time period for which a user may expose his skin, which is applied with sun cream having a sun protection factor, to sun light without getting sunburn. Determining 884 the time period, for which a user may expose his skin to sun light without getting sunburn, while providing this time period according to FIG. 13 is performed by choosing a time period corresponding to the skin type, the sun protection factor of applied sun cream and the UVI from the table of FIG. 14. This table shows in its left vertical column the UVI from 1 to >10 and in its upper horizontal row combination of skin type parameters (light, medium, dark) and sun protection factors (10, 20, . . . ) light/10, medium/10, dark/10 and light/20. In the region framed by the left vertical column and the upper horizontal row the table shows for each UVI and for each combination of skin type parameter and sun protection factor a corresponding time period, for which the user may expose his skin provided with sun cream to the sun light without getting a sunburn. In detail, when the received UVI is 1 or 2, a time period for which a light skinned person may expose his skin provided with sun cream having sun protection factor 10 to sun light amounts 3 hours, a time period for which a medium skinned person may expose his skin provided with sun cream having sun protection factor 10 to sun light amounts 5 hours, a time period for which a dark skinned person may expose his skin provided with sun cream having sun protection factor 10 to sun light amounts for 7 hours and a time period for which a light skinned person may expose his skin provided with sun cream having sun protection factor 20 to sun light amounts 3.5 hours. When the received UVI is 3, 4 or 5, a time period for which a light skinned person may expose his skin provided with sun cream having sun protection factor 10 to sun light amounts 2 hours, a time period for which a medium skinned person may expose his skin provided with sun cream having sun protection factor 10 to sun light amounts 3 hours, a time period for which a dark skinned person may expose his skin provided with sun cream having sun protection factor 10 to sun light amounts for 5 hours and a time period for which a light skinned person may expose his skin provided with sun cream having sun protection factor 20 to sun light amounts 2.5 hours. When the received UVI is 6 or 7, a time period for which a light skinned person may expose his skin provided with sun cream having sun protection factor 10 to sun light amounts 1.5 hours, a time period for which a medium skinned person may expose his skin provided with sun cream having sun protection factor 10 to sun light amounts 2 hours, a time period for which a dark skinned person may expose his skin provided with sun cream having sun protection factor 10 to sun light amounts for 3 hours and a time period for which a light skinned person may expose his skin provided with sun cream having sun protection factor 20 to sun light amounts 2 hours. When the received UVI is 8, 9 or 10, a time period for which a light skinned person may expose his skin provided with sun cream having sun protection factor 10 to sun light amounts 1 hour, a time period for which a medium skinned person may expose his skin provided with sun cream having sun protection factor 10 to sun light amounts 1.5 hours, a time period for which a dark skinned person may expose his skin provided with sun cream having sun protection factor 10 to sun light amounts for 2 hours and a time period for which a light skinned person may expose his skin provided with sun cream having sun protection factor 20 to sun light amounts 1.5 hours. When the received UVI is higher than 10, a time period for which a light skinned person may expose his skin provided with sun cream having sun protection factor 10 to sun light amounts 20 minutes, a time period for which a medium skinned person may expose his skin provided with sun cream having sun protection factor 10 to sun light amounts 30 minutes, a time period for which a dark skinned person may expose his skin provided with sun cream having sun protection factor 10 to sun light amounts for 40 minutes and a time period for which a light skinned person may expose his skin provided with sun cream having sun protection factor 20 to sun light amounts 30 minutes. The table may further include time periods for further combinations of skin type parameters and sun protection factors of applied sun cream.

Figure 15:
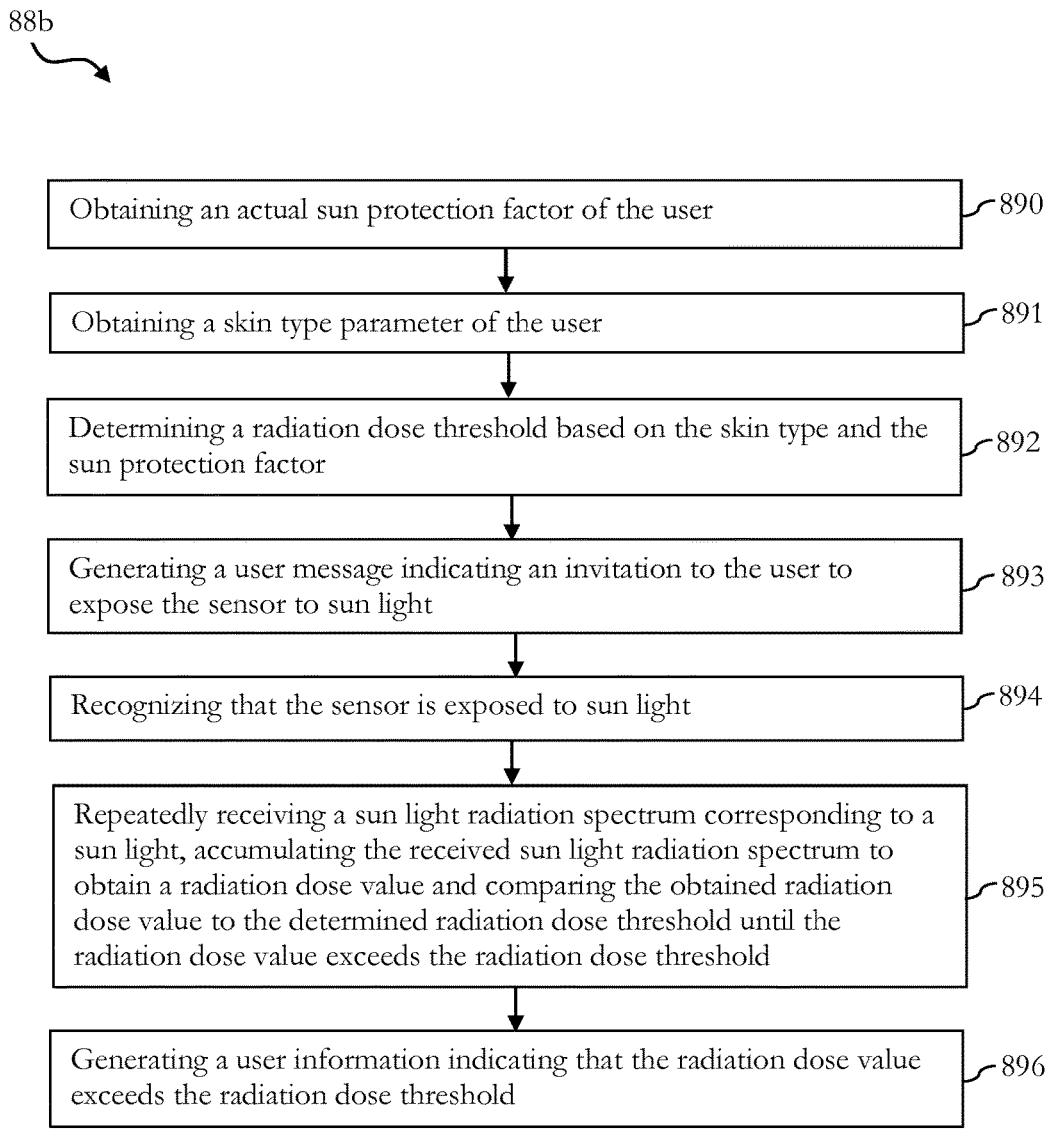
FIG. 15 schematically illustrates a method for informing a user to stop sunbathing when a radiation dose value exceeds a radiation dose threshold.

FIG. 15 schematically illustrates a method 88*b* for informing a user to stop sunbathing when a radiation dose value exceeds a radiation dose threshold. At 890 an actual sun protection factor of the user is obtained. Obtaining the actual sun protection factor of the applied sun cream is carried out by way of the method 8 for providing an actual sun protection factor of a sun cream applied to a user's skin described with reference to FIG. 11 at 80 to 88. Alternatively, the actual sun protection factor may be entered via a user interface. At 891 a skin type parameter of a user is obtained. Obtaining the skin type parameter is carried out by way of the method 4 for providing a skin type parameter described with reference to FIG. 3. Alternatively, the skin type of the user may be obtained from data storage or from a user profile stored on a server or in a cloud.

At 892 a radiation dose threshold is determined based on the skin type and the sun protection factor. This is explained in detail with reference to FIG. 16. At 893 a user message is generated indicating an invitation to the user to remove the sensor from the second location and to expose the sensor to sun light. At 894 it is recognized that the sensor is exposed to sun light. Recognizing that the sensor is positioned to sun light includes receiving a predetermined user input such as pressing a predetermined button. Alternatively, radiation measurement data detected after the generation of the user message indicating on a display screen an invitation to a user to position the sensor to sun light, is received and the radiation spectrum of the radiation reflected from the first position on the user's skin with sun cream previously received at 86 of the method described with reference to FIG. 11 may be compared and, when a substantial change in intensity is detected, it is determined that the sensor is positioned to sun light.

At 895 a sun light radiation spectrum corresponding to the sun light is repeatedly received, the received sun light radiation spectrum is repeatedly accumulated to obtain a radiation dose value and the obtained radiation dose value is repeatedly compared to the determined radiation dose threshold until the radiation dose value exceeds the radiation dose threshold. This is realized as explained with reference to FIG. 10A and FIG. 10B. At 896 user information is generated indicating that the radiation dose value exceeds the radiation dose threshold.

Figures 16, 17:
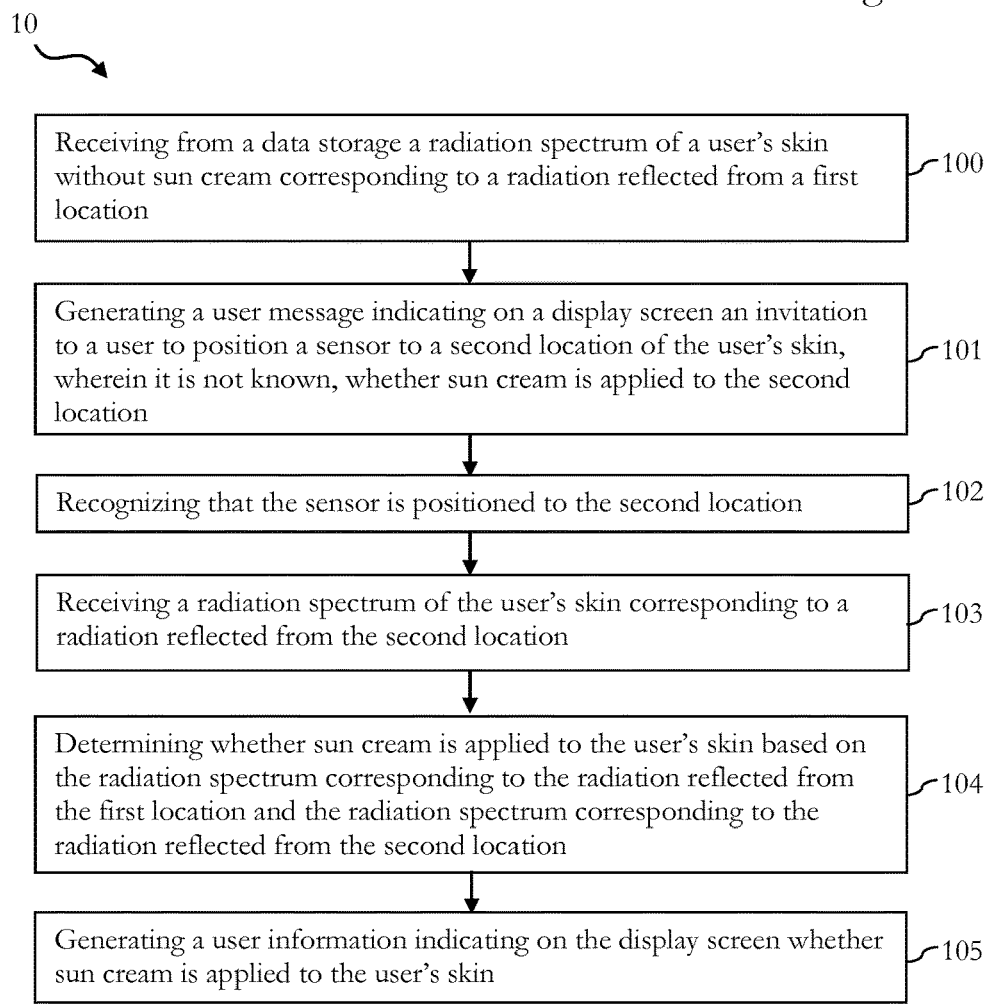
FIG. 16 schematically illustrates an example of determining a radiation dose threshold while informing the user to stop sunbathing when a radiation dose value exceeds a radiation dose threshold according to FIG. 15.
FIG. 17 schematically illustrates a method for providing information, whether sun cream is applied to a user's skin.

FIG. 16 presents a table which indicates for various skin types and for various actual sun protection factors a corresponding radiation dose threshold. The radiation dose threshold is a minimum erythemal dose threshold (MED threshold) indicating the minimum erythemal dose (MED) which shall not be exceeded during sunbathing. Determining 892 the radiation dose threshold while informing a user to stop sunbathing when a radiation dose value exceeds a radiation dose threshold according to FIG. 15 is performed by choosing a radiation dose threshold corresponding to the skin type parameter and the actual sun protection factor from the table of FIG. 16. This table shows in its left vertical column the skin type parameters light, medium and dark and in its upper horizontal row the sun protection factors 10, 20 and 30. In the region framed by the left vertical column and the upper horizontal row the table shows for each skin type parameter and for each sun protection factor a corresponding radiation dose threshold for skin provided with sun cream. In detail, the radiation dose threshold for a light skinned person with sun cream having a sun protection factor 10 amounts 15, for a light skinned person with sun cream having a sun protection factor 20 amounts 20 and for a light skinned person with sun cream having a sun protection factor 10 amounts 25. The radiation dose threshold for a medium skinned person with sun cream having sun protection factor 10 amounts 25, for a medium skinned person with sun cream having a sun protection factor 20 amounts 30 and for a medium skinned person with sun cream having sun protection factor 10 amounts 35. The radiation dose threshold for a dark skinned person with sun cream having sun protection factor 10 amounts 35, for a dark skinned person with sun cream having a sun protection factor 20 amounts 40 and for a dark skinned person with sun cream having sun protection factor 10 amounts 45.

FIG. 17 schematically illustrates a method 10 for providing information whether sun cream is applied to a user's skin. At 100 a radiation spectrum of the user's skin without sun cream corresponding to a radiation reflected from a first location on the user's skin is received from a data storage. The radiation spectrum corresponding to the radiation reflected from the first location is sensed in advance and stored e.g. as part of a user profile in the data storage. At 101 a user message is generated indicating on a display screen an invitation to the user to position a sensor to a second location of the user's skin, wherein it is not known, whether sun cream is applied to the second location of the user's skin. The second location is a location within an area surrounding the first location. At 102 it is recognized that the sensor is positioned to the second location. Recognizing that the sensor is positioned to the second location is carried out as described with reference to FIG. 11 at 85. At 103 a radiation spectrum of the user's skin corresponding to a radiation reflected from the second location is received, wherein it is not known, whether sun cream is applied to the second location. At 104 it is determined whether sun cream is applied to the user's skin, in particular to the second location, based on the radiation spectrum corresponding to the radiation reflected from the first location received from the data storage and the radiation spectrum corresponding to the radiation reflected from the second location sensed in response to the invitation to the user to position the sensor to the second location of a user's skin. This is explained in detail with reference to FIG. 18 below. At 105 a user information is generated indicating on the display screen whether sun cream is applied to the user's skin, at least to the second location of the user's skin.

Figure 18:
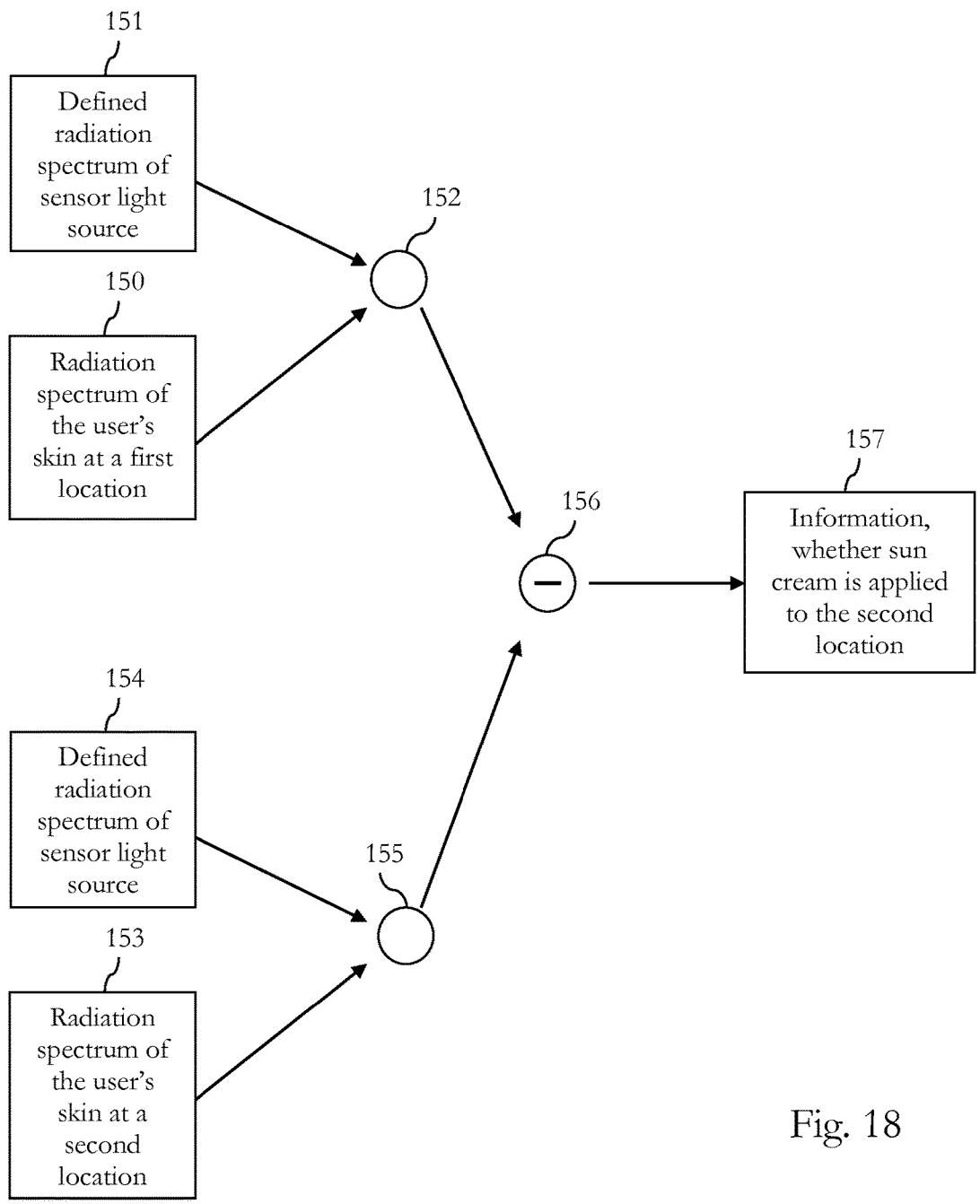
FIG. 18 schematically illustrates an example of determining whether sun cream is applied to the user's skin while providing information, whether sun cream is applied according to FIG. 17.

FIG. 18 schematically illustrates an example of determining 104 whether sun cream is applied to the user's skin while providing information whether sun cream is applied to the user's skin according to FIG. 17. At 150 the radiation spectrum of the user's skin at the first location without sun cream sensed in advance and stored in the data storage is provided. An example for a radiation spectrum for the user's skin without sun cream in dependence on the wavelength is presented by curve 160 of FIG. 19 which is explained in detail below. At 151 a first defined radiation spectrum of a sensor light source which was used, when sensing the radiation spectrum of the user's skin at the first location without sun cream in advance, is retrieved from the data storage. At 152 a reflectance curve for the user's skin without sun cream is derived from the radiation spectrum of the user's skin at the first location and the first defined radiation spectrum of the sensor light source underlying the radiation spectrum of the user's skin at the first location. An example for a reflectance curve for the user's skin without sun cream in dependency on the wavelength, which is based on the radiation spectrum presented by curve 160, is presented by curve 162 of FIG. 20 which is explained in detail below. At 153 the radiation spectrum of the user's skin at the second location sensed in response to the invitation to the user to position the sensor to the second location of the user's skin is provided. The radiation spectrum for the user's skin at the second location is for example a radiation spectrum for the user's skin with sun cream as exemplarily presented by curve 161 of FIG. 19. At 154 a second defined radiation spectrum of a sensor light source which is used, when sensing the radiation spectrum of the user's skin at the second location with sun cream, is retrieved from the data storage. At 155 a reflectance curve for the user's skin, of which it is not known, whether sun cream is applied, in dependence on the wavelength is derived from the radiation spectrum of the user's skin at the second location and the second defined radiation spectrum of sensor light source underlying the radiation spectrum of the user's skin at the second location. An example for a reflectance curve for skin with sun cream in dependence on the wavelength, which is based on the radiation spectrum presented by curve 161, is presented by curve 163 of FIG. 20, which is explained in detail below. At 156 the reflectance curve 162 for skin without sun cream is subtracted from the reflectance curve 163 for skin, of which it is not known, whether sun cream is applied, and it is derived in dependence on the differences between the curves 162 and 163 whether sun cream is applied to the second location. At 157 information is provided, whether sun cream is applied to the second location on the user's skin.

Alternatively, instead of determining a reflectance curve for the user's skin without sun cream and a reflectance curve for the user's skin, of which it is not known, whether sun cream is applied, the radiation spectrum of the user's skin at the first location (curve 160 of FIG. 19) may be subtracted from the radiation spectrum of the user's skin at the second location (curve 161 of FIG. 19) and it may be derived in dependence on the differences between the curves 160 and 161, whether sun cream is applied to the second location.

Figure 19:
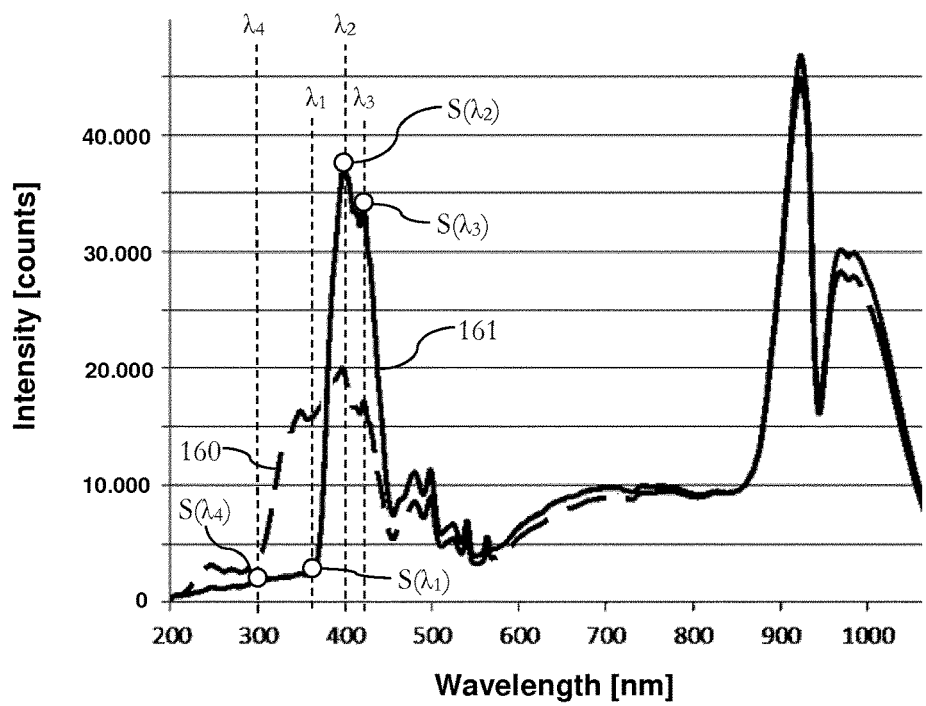
FIG. 19 shows examples for radiation curves of a user's skin in dependence on a wavelength.

FIG. 19 shows the radiation spectrum curve 160 for the user's skin without sun cream and the radiation spectrum curve 161 for the user's skin with sun cream. The radiation spectrum curve 160 raises from about 300 nm to a first local maximum at 400 nm and drops to a local minimum at about 550 nm. In the range from 550 nm to 850 nm the radiation spectrum curve 160 slowly raises. From about 850 nm the radiation spectrum curve 160 rapidly raises to a second local maximum at 925 nm. The radiation spectrum curve 161 raises from about 370 nm to a local maximum at 400 nm, the intensity of which is twice the intensity of the first local maximum of radiation spectrum curve 160, and drops to a local minimum at about 550 nm having similar intensity as the local minimum of radiation spectrum curve 160. In the range from 550 nm to 850 nm the radiation spectrum curve 161 slowly raises. From about 850 nm the radiation spectrum curve 161 rapidly raises to another local maximum at 925 nm having similar intensity as the local minimum of radiation spectrum curve 160.

Figure 21:
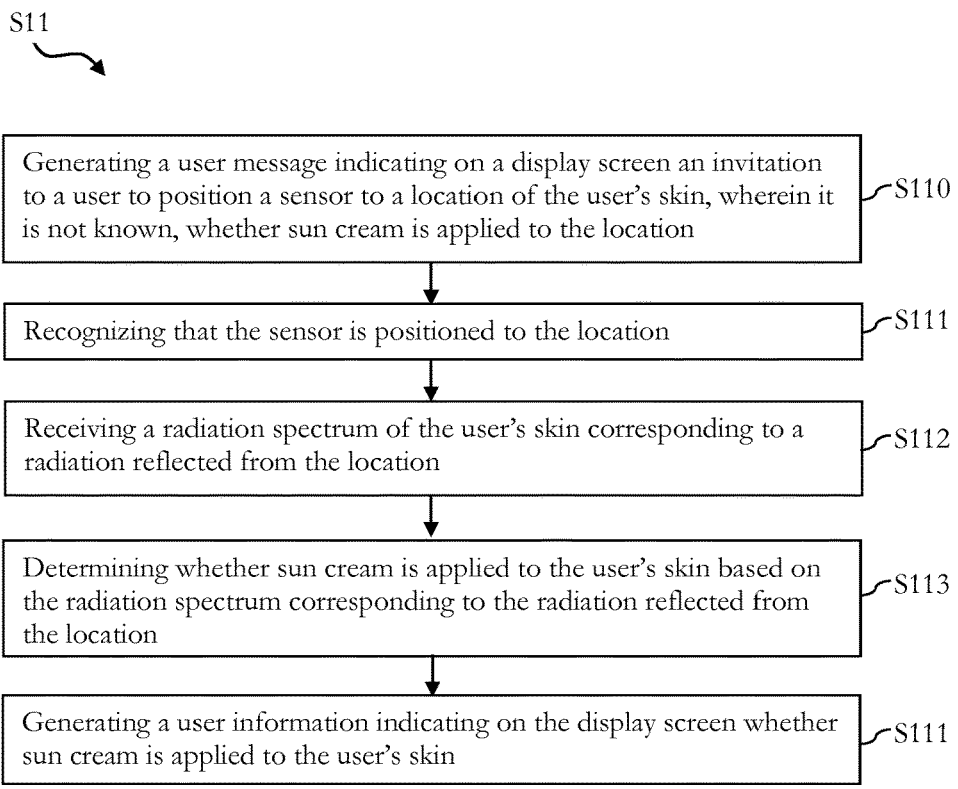
FIG. 21 schematically illustrates another method for providing information, whether sun cream is applied to a user's skin.

FIG. 21 schematically illustrates another method S11 for providing information whether sun cream is applied to a user's skin. At S110 a user message is generated indicating on a display screen an invitation to the user to position a sensor to a location of the user's skin, wherein it is not known, whether sun cream is applied to the location of the user's skin. At S111 it is recognized that the sensor is positioned to the location. Recognizing that the sensor is positioned to the location is performed analogous to recognizing that the sensor is positioned to the second location as described with reference to FIG. 11 at 85. At S112 a radiation spectrum of the user's skin corresponding to a radiation reflected from the location is received, wherein it is not known, whether sun cream is applied to the location. At S113 it is determined whether sun cream is applied to the user's skin based on the radiation spectrum corresponding to the radiation reflected from the location sensed in response to the invitation to the user to position the sensor to the location of a user's skin. This is explained in detail with reference to FIG. 22 below. At S114 a user information is generated indicating on the display screen whether sun cream is applied to the user's skin.

Figure 22:
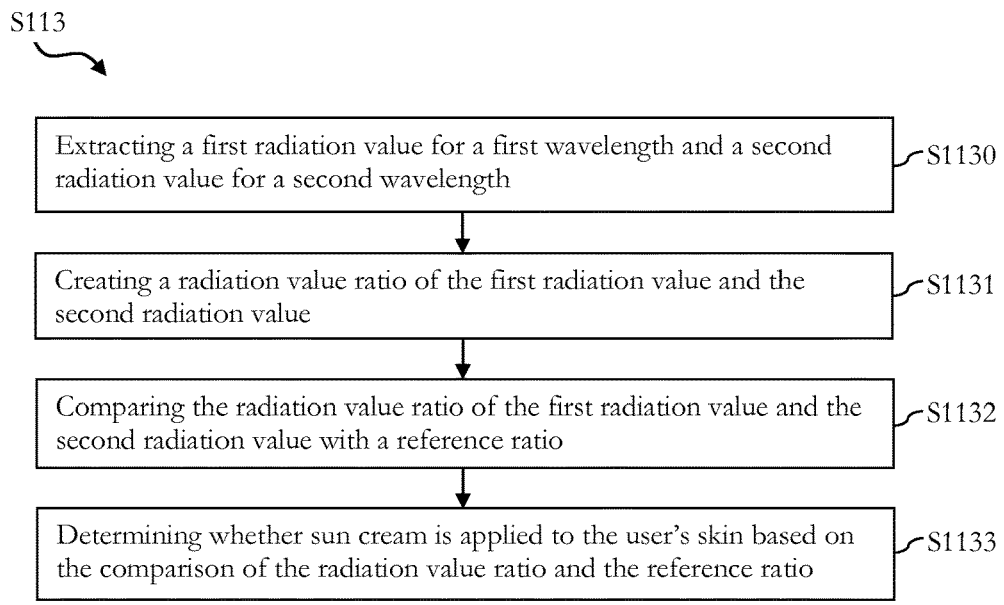
FIG. 22 schematically illustrates an example of determining whether sun cream is applied to the user's skin while providing information, whether sun cream is applied according to FIG. 21.
Figure 23:
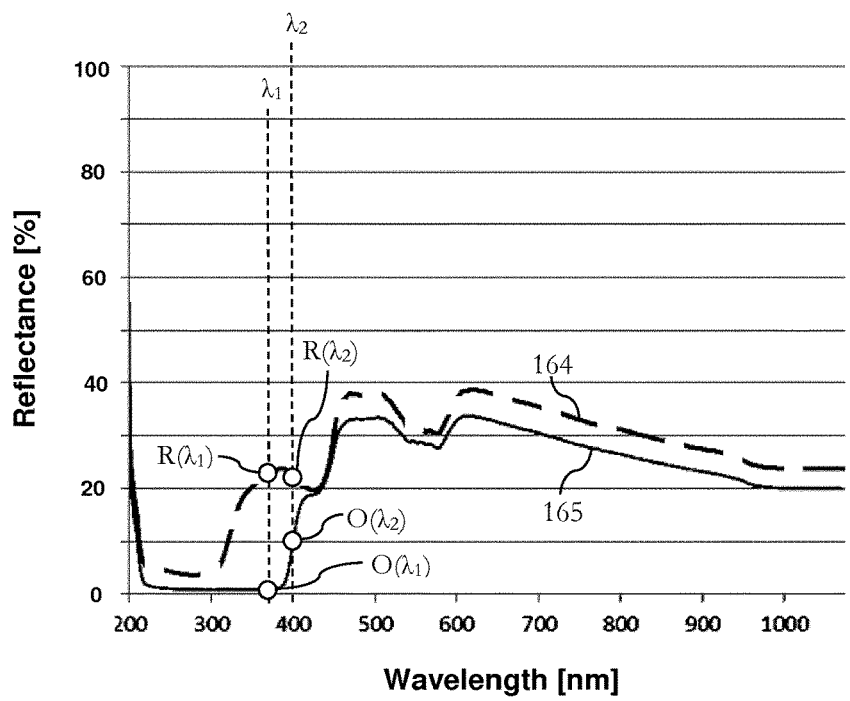
FIG. 23 shows examples for reflectance curves of a user's skin without and with sun cream with an organic filter in dependence on a wavelength.

FIG. 22 schematically illustrates an example of determining S113 whether sun cream is applied to the user's skin while providing information whether sun cream is applied to the user's skin according to FIG. 21. At S1130 a first radiation value $S(\lambda_1)$ for a first wavelength $\lambda_1$ and a second radiation value $S(\lambda_2)$ for a second wavelength $\lambda_2$ are extracted from the radiation spectrum corresponding to the radiation reflected from the location sensed in response to the invitation to the user to position the sensor to the location of the user's skin. The radiation spectrum may be the radiation spectrum curve 161 of FIG. 19. The first wavelength $\lambda_1$ is 375 nm and the first radiation value $S(\lambda_1)$ at 375 nm amounts about 3.000 counts. The second wavelength $\lambda_2$ is 400 nm and the second radiation value $S(\lambda_2)$ at 400 nm amounts about 37.000 counts. At S1131 a radiation value ratio of the first radiation value and the second radiation value is created by dividing the first radiation value by the second radiation value resulting at a radiation value ratio of about 0.08.

At S1132 the radiation value ratio of the first radiation value and the second radiation value is compared with a reference ratio. The reference ratio is for example 0.5. At S1133 it is determined whether sun cream is applied to the user's skin based on the radiation value ratio and the reference ratio. If the radiation value ratio is equal to or higher than the reference ratio, it is determined that no sun cream is applied to the user's skin. If the radiation value ratio is smaller than the reference ratio, it is determined that sun cream is applied to the user's skin.

Instead of receiving a radiation spectrum of the user's skin corresponding to a radiation reflected from the location, wherein it is not known, whether sun cream is applied to the location, and extracting the first radiation value and the second radiation value from the received radiation spectrum, the first radiation value and the second radiation value corresponding to a radiation reflected from the location, wherein it is not known, whether sun cream is applied to the location, may be directly received.

Figure 20:
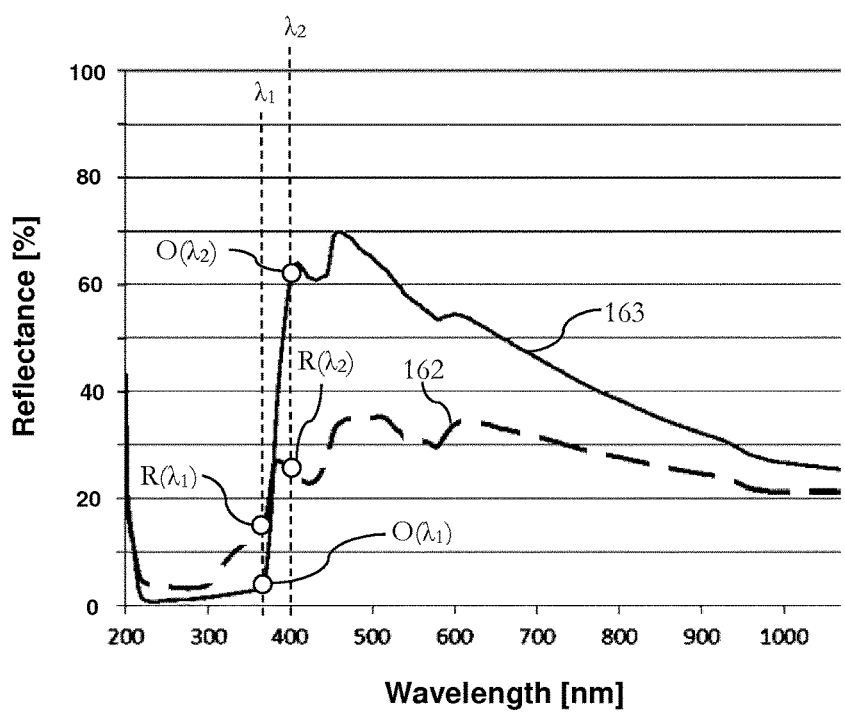
FIG. 20 shows examples for reflectance curves of a user's skin without and with sun cream with an inorganic filter in dependence on a wavelength.
Figure 24:
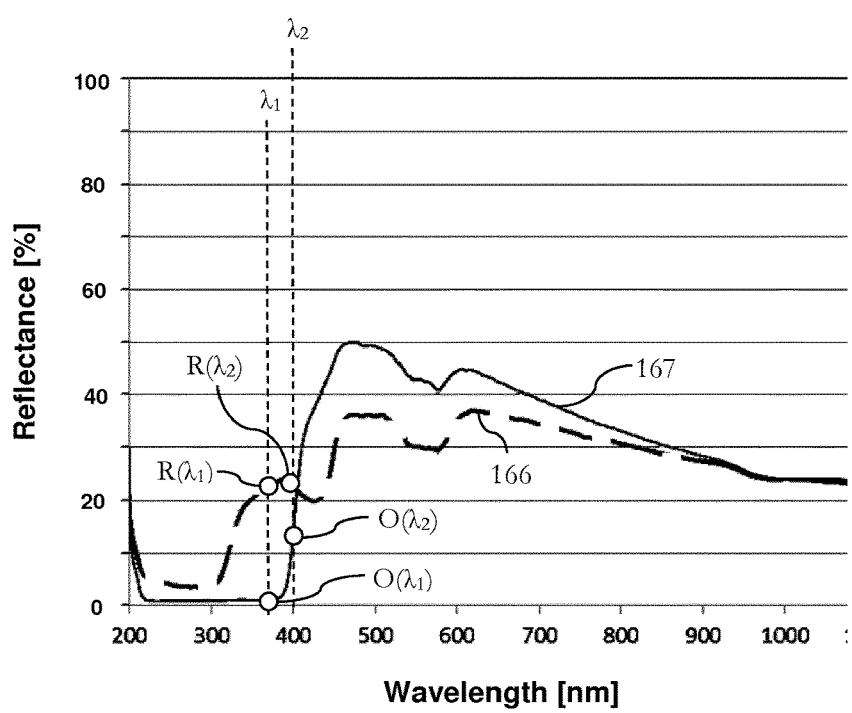
FIG. 24 shows examples for reflectance curves of a user's skin without and with sun cream with organic and inorganic filters in dependence on a wavelength.

Conventional sun creams may be classified in three categories of sun cream dependent on a filter type of the sun cream, namely sun cream with organic filters (chemical filters), sun cream with inorganic filters (physical filters) and sun cream with a mixture of organic filters and inorganic filters. Organic filters in large part absorb UV rays of the sun light thereby releasing heat. In contrast to this, inorganic filters in large part block the UV rays of the sun light, e.g. reflect and/or scatter the UV rays. Each filter type causes, when applied to a user's skin, a characteristic reflectance resulting in particular in a characteristic shape of a reflectance curve. An example of a reflectance curve 163 of sun cream with an inorganic filter is represented by FIG. 20, an example of a reflectance curve 165 of sun cream with an organic filter is presented by FIG. 23 and an example of a reflectance curve 167 of sun cream with a mixture of organic and inorganic filters is represented by FIG. 24. Each of the reflectance curves 163, 165, 167 further depends on a corresponding reflectance curve 162, 164, 166 characteristic for the user's skin without sun cream.

As shown by FIG. 20, the reflectance curve 163 of the sun cream with an organic filter ranges in a wavelength range from 250 nm to about 370 nm at reflectance values below 3%. From a wavelength of 370 nm the reflectance curve 163 raises to a reflectance value of about 65% at 400 nm, drops to a reflectance value of about 60% at about 430 nm and again raises to a reflectance value of about 70% at about 460 nm. From a wavelength of 460 nm the reflectance curve 163 continuously drops to reflectance values below 30% at wavelengths higher than 900 nm. The reflectance curve 165 of the sun cream with an organic filter in FIG. 23 ranges in a wavelength range from 250 nm to about 390 nm at reflectance values below 2%. From a wavelength of 390 nm the reflectance curve 165 raises to a plateau with a reflectance value of about 20%, further raises to a reflectance value of about 35% at 490 nm, drops to a reflectance value of about 28% at about 560 nm and again raises to a reflectance value of about 35% at about 610 nm. From a wavelength of 610 nm the reflectance curve 165 continuously drops to reflectance values below 20% at wavelengths higher than 900 nm. The reflectance curve 167 of the sun cream with a mixture of organic and inorganic filters in FIG. 24 ranges in a wavelength range from 250 nm to about 390 nm at reflectance values below 2%. From a wavelength of 390 nm the reflectance curve 167 raises to a reflectance value of about 50% at 480 nm, drops to a reflectance value of about 40% at about 580 nm and again raises to a reflectance value of about 45% at about 610 nm. From a wavelength of 610 nm the reflectance curve 167 continuously drops to reflectance values below 25% at wavelengths higher than 900 nm. The reflectance curves 162, 164, 166 representing the reflectance of skin without sun cream range in a wavelength range from 250 nm to about 300 nm at reflectance values below 5%. From a wavelength of 300 nm the reflectance curves 162, 164, 166 raise to a reflectance value of about 25% at 380 nm, drop to a reflectance value of about 20% at about 430 nm, again raise to a reflectance value of about 35% at about 500 nm, drop to a reflectance value of about 30% at about 560 nm and again raise to a reflectance value of about 35% at about 610 nm. From a wavelength of 610 nm the reflectance curves 162, 164, 166 continuously drop to reflectance values below 25% at wavelengths higher than 900 nm.

Both, organic and inorganic filters can significantly reduce the number of dangerous UV rays impinging the user's skin, in particular the epidermis or the dermis of the user's skin when applied to the user's skin. However, some humans show allergic reactions against at least one of inorganic filters or organic filters. Therefore, it is of interest to determine the category of an applied sun cream.

Figure 25:
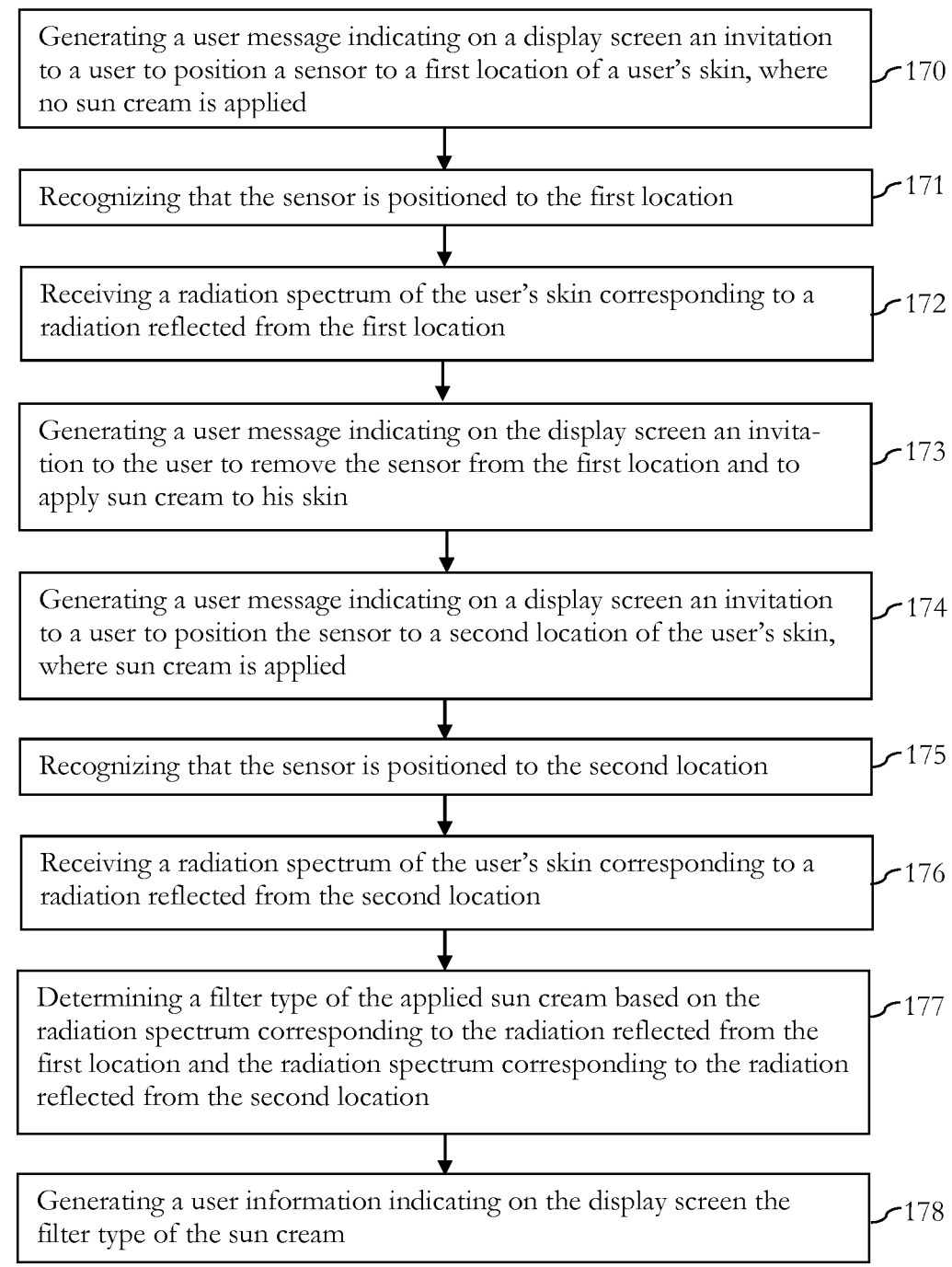
FIG. 25 schematically illustrates a first method for providing a filter type of sun cream applied to a user's skin.

FIG. 25 schematically illustrates a method 17 for providing a filter type of a sun cream applied to a user's skin. At 170 a user message is generated indicating on a display screen an invitation to a user to position a sensor to a first location of a user's skin, where no sun cream is applied. At 171 it is recognized that the sensor is positioned to the first location. Recognizing that the sensor is positioned to the first location is carried out as described with reference to FIG. 11 at 81. At 172 a radiation spectrum of the user's skin without sun cream corresponding to a radiation reflected from the first location without sun cream is received, e.g. a radiation spectrum as presented by curve 160 of FIG. 19. At 173 a user message is generated indicating on the display screen an invitation to the user to remove the sensor from the first location and to apply sun cream to the skin. At 174 a user message is generated indicating on the display screen an invitation to the user to position the sensor to a second location of the user's skin where sun cream is applied. At 175 it is recognized that the sensor is positioned to the second location. Recognizing that the sensor is exposed to the second location is carried out as described with reference to FIG. 11 at 85. At 176 a radiation spectrum of the user's skin with sun cream corresponding to a radiation reflected from the second location is received, e.g. a radiation spectrum as presented by curve 161 of FIG. 19. At 177 a filter type of the applied sun cream is determined based on the radiation spectrum of the user's skin without sun cream and the radiation spectrum of the user's skin with sun cream. This is explained in detail with reference to FIG. 26 below. At 178 a user information is generated indicating on the display screen the filter type of the sun cream applied to the user's skin to the user.

Figure 26:
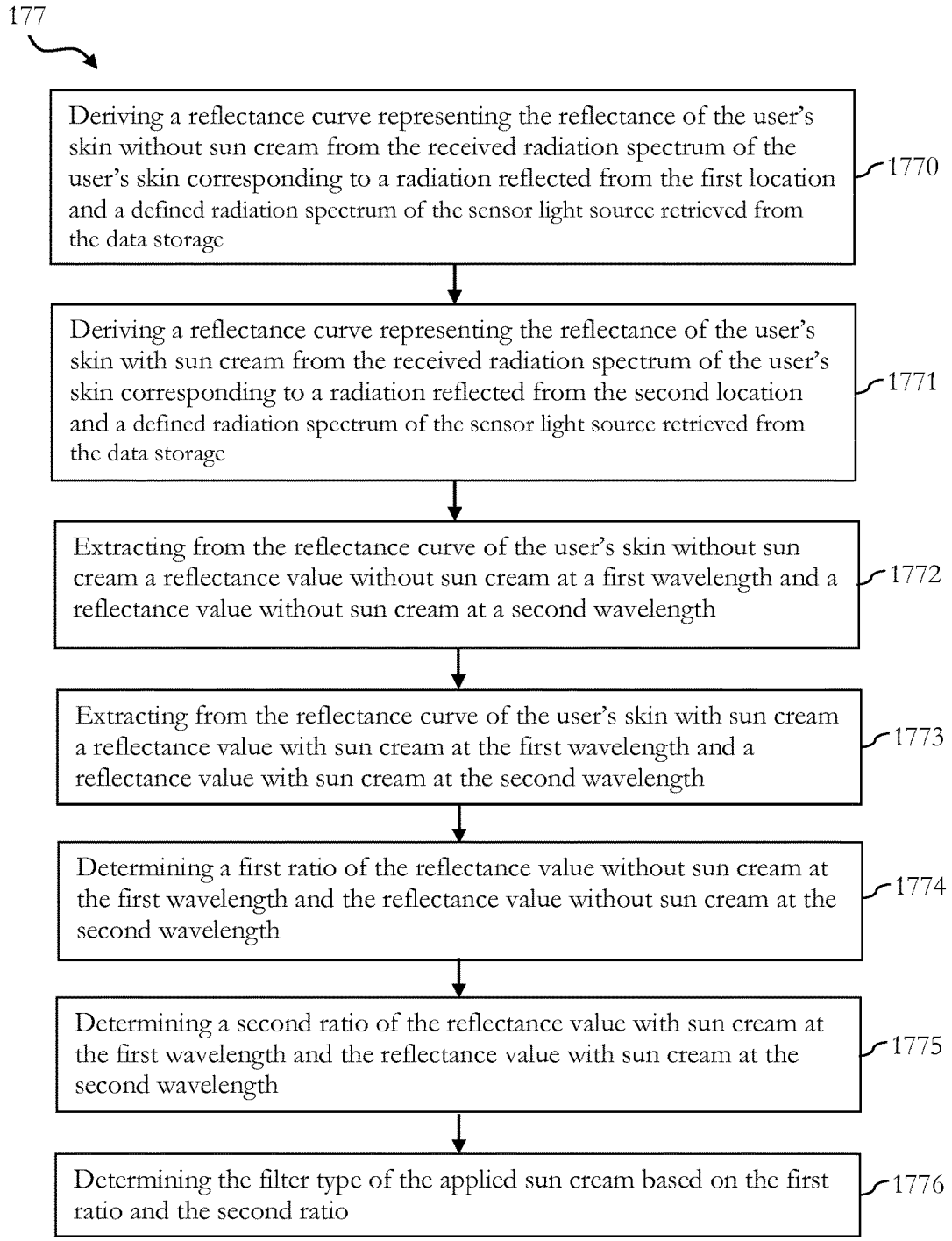
FIG. 26 schematically illustrates an example of determining a filter type of the sun cream applied to the user's skin while providing the filter type of the sun cream according to FIG. 25.

FIG. 26 schematically illustrates an example of determining 177 a filter type of a sun cream applied to the user's skin while providing information on the filter type of a sun cream according to FIG. 25. At 1770 a reflectance curve representing the reflectance of the user's skin without sun cream is derived from the received radiation spectrum of the user's skin corresponding to a radiation reflected from the first location and a defined radiation spectrum of the sensor light source retrieved from the data storage. The reflectance curve representing the reflectance of the user's skin without sun cream is for example curve 162 shown by FIG. 20. At 1771 a reflectance curve representing the reflectance of the user's skin with sun cream is derived from the received radiation spectrum of the user's skin corresponding to the radiation reflected from the second location and the defined radiation spectrum of the sensor light source retrieved from the data storage. The reflectance curve representing the reflectance of the user's skin with sun cream is for example curve 163 shown by FIG. 20. At 1772 a reflectance value $R(\lambda_1)$ without sun cream at a first wavelength $\lambda_1$ and a reflectance value $R(\lambda_2)$ without sun cream at a second wavelength $\lambda_2$ is extracted from the reflectance curve 162 of the user's skin without sun cream. The first wavelength is a wavelength in a range from 375 nm to 395 nm and the second wavelength is a wavelength in a range from 395 nm to 405 nm. In FIG. 20 the first wavelength $\lambda_1$ is 375 nm and the second wavelength $\lambda_2$ is 400 nm. For a first wavelength at 375 nm the extracted reflectance value is about 17% and for a second wavelength at 400 nm the reflectance value is about 25%. At 1773 a reflectance value $O(\lambda_1)$ with sun cream at the first wavelength $\lambda_1$ and a reflectance value $O(\lambda_2)$ with sun cream at the second wavelength $\lambda_2$ is extracted from the reflectance curve 163 of the user's skin with sun cream. E.g. for a first wavelength at 375 nm the extracted reflectance value is about 3% and for a second wavelength at 400 nm the reflectance value is about 61%.

At 1774 a first ratio of the reflectance value $R(\lambda_1)$ without sun cream at the first wavelength and the reflectance value $R(\lambda_2)$ without sun cream at the second wavelength is determined by dividing the reflectance value $R(\lambda_1)$ without sun cream at the first wavelength by the reflectance value $R(\lambda_2)$ without sun cream at the second wavelength. At 1775 a second ratio of the reflectance value $O(\lambda_1)$ with sun cream at the first wavelength and the reflectance value $O(\lambda_2)$ with sun cream at the second wavelength is determined by dividing the reflectance value $O(\lambda_1)$ with sun cream at the first wavelength by the reflectance value $O(\lambda_2)$ with sun cream at the second wavelength. At 1776 the filter type of the applied sun cream is determined based on the first ratio and the second ratio by comparing the first ratio related to the reflectance curve 160 without sun cream and the second ratio related to the reflectance curve 161 with sun cream.

In addition, the method 17 for determining a filter type of an applied sun cream may further include extracting from the reflectance curve of the user's skin without sun cream a reflectance value without sun cream at a third wavelength and potentially a reflectance value without sun cream at a fourth wavelength and from the reflectance curve of the user's skin with sun cream a reflectance value with sun cream at the third wavelength and potentially a reflectance value with sun cream at the fourth wavelength. The third wavelength is a wavelength in the range from 405 nm to 435 nm, e.g. a wavelength of 425 nm, and the fourth wavelength is a wavelength in the range from 300 to 375 nm or in the range from 430 nm to 500 nm. Accordingly, the reflectance value without sun cream at the first wavelength, the second wavelength, the third wavelength and potentially at the fourth wavelength are related to each other and the reflectance value with sun cream at the first wavelength, the second wavelength, the third wavelength and potentially at the fourth wavelength are related to each other. The results thereof are then compared to determine the filter type of the applied sun cream.

Figure 27:
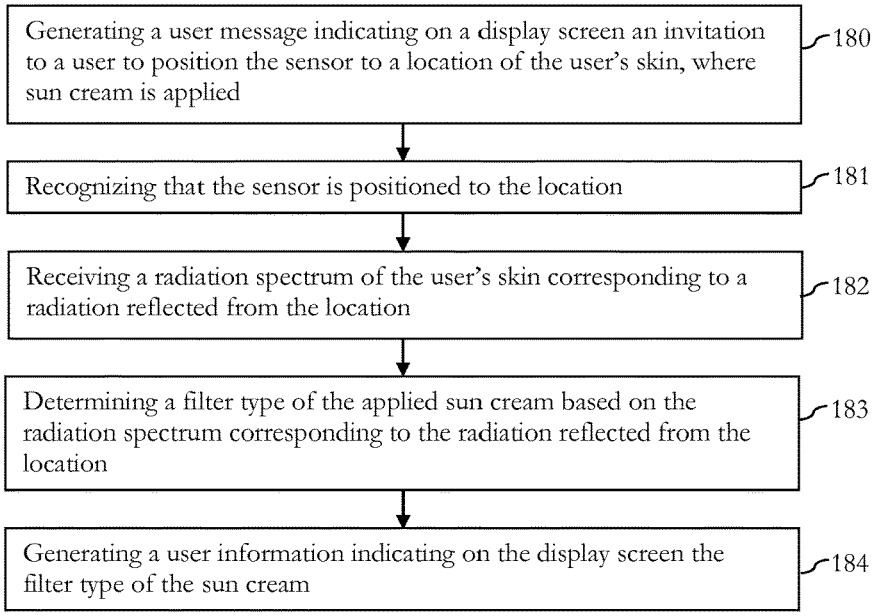
FIG. 27 schematically illustrates a second method for providing a filter type of sun cream applied to a user's skin.

FIG. 27 schematically illustrates a second method 18 for providing a filter type of a sun cream applied to a user's skin. At 180 a user message is generated indicating on the display screen an invitation to the user to position the sensor to a location of the user's skin where sun cream is applied. At 181 it is recognized that the sensor is positioned to the location. Recognizing that the sensor is exposed to the location is carried out as described with reference to FIG. 21 at S111. At 182 a radiation spectrum of the user's skin with sun cream corresponding to a radiation reflected from the location is received, e.g. a radiation spectrum as presented by curve 161 of FIG. 19. At 183 a filter type of the applied sun cream is determined based on the radiation spectrum of the user's skin with sun cream. This is explained in detail with reference to FIG. 28 and FIG. 29 below. At 184 a user information is generated indicating on the display screen the filter type of the sun cream applied to the user's skin to the user.

Figure 28:
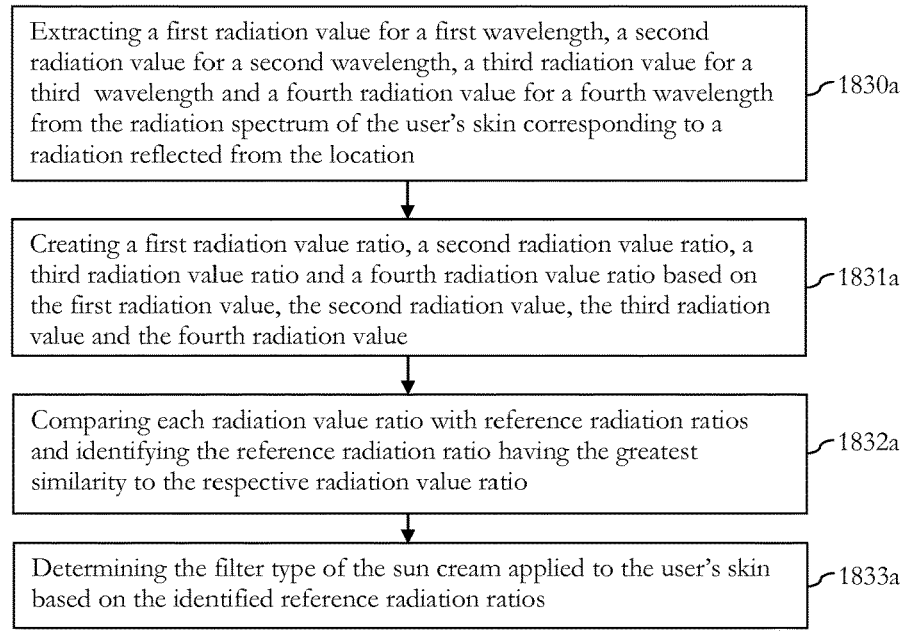
FIG. 28 schematically illustrates an example of determining a filter type of the sun cream applied to the user's skin while providing the filter type of the sun cream according to FIG. 27.

FIG. 28 schematically illustrates an example of determining 183a a filter type of a sun cream applied to the user's skin while providing information on the filter type of the applied sun cream according to FIG. 27. At 1830a a first radiation value for a first wavelength, a second radiation value for a second wavelength, a third radiation value for a third wavelength and a fourth radiation value for a fourth wavelength are extracted from the radiation spectrum corresponding to the radiation reflected from the location sensed in response to the invitation to the user to position the sensor to the location of the user's skin to which sun cream is applied, e.g. from curve 161 of FIG. 19. In case of curve 161 the first wavelength $\lambda_1$ is 375 nm and the first radiation value $S(\lambda_1)$ at 375 nm amounts about 3.000 counts. The second wavelength $\lambda_2$ is 400 nm and the second radiation value $S(\lambda_2)$ at 400 nm amounts about 37.000 counts. The third wavelength $\lambda_3$ is 425 nm and the third radiation value $S(\lambda_3)$ at 425 nm amounts about 32.000 counts. The third wavelength $\lambda_4$ is 300 nm and the fourth radiation value $S(\lambda_4)$ at 300 nm amounts about 2.000 counts. At 1831a a first radiation value ratio of the first radiation value and the second radiation value, a second radiation value ratio of the first radiation value and the third radiation value, a third radiation value ratio of the second radiation value and the third radiation value and a fourth radiation value ratio of the second radiation value and the fourth radiation value are created. The radiation value ratios are created analogous to the radiation value described with respect to FIG. 22 at 1131. The first radiation value ratio amounts about 0.08 in case that the first radiation value and the second radiation value are extracted from curve 161 of FIG. 19. At 1832a each radiation value ratio is compared to corresponding reference ratios including a reference radiation ratio relating to a sun cream with organic filters, a reference radiation ratio relating to a sun cream with inorganic filters and a reference radiation ratio relating to a sun cream with mixed filters. For the first radiation value ratio the reference radiation ratio relating to a sun cream with organic filters is 0.15, the reference radiation ratio relating to a sun cream with inorganic filters is 0.08 and the reference radiation ratio relating to a sun cream with mixed filters is 0.11. Then, for each radiation value ratio the reference radiation ratio having the greatest similarity to the radiation value ratio is identified. At 1833a the filter type of the applied sun cream is determined based on the identified reference radiation ratios.

Alternatively to 1832a and 1833a differences between the radiation value ratios may be formed, the differences may be compared to reference threshold differences relating to sun cream with different filter types and the filter type may be determined based on the result of comparing the differences between the radiation value ratios with the corresponding reference threshold differences.

Figure 29:
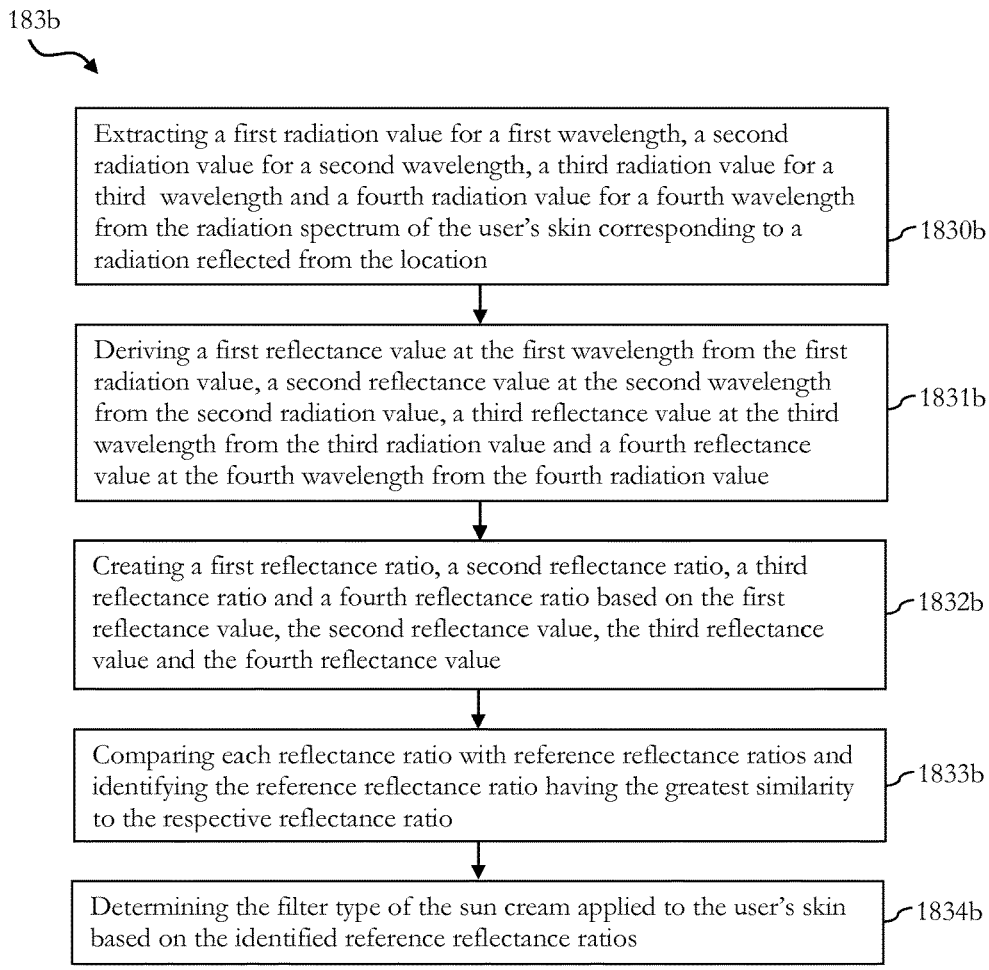
FIG. 29 schematically illustrates another example of determining a filter type of the sun cream applied to the user's skin while providing the filter type of the sun cream according to FIG. 27.

FIG. 29 schematically illustrates an example of determining 183b a filter type of a sun cream applied to the user's skin while providing information on the filter type of the applied sun cream according to FIG. 27. At 1830b a first radiation value for a first wavelength, a second radiation value for a second wavelength, a third radiation value for a third wavelength and a fourth radiation value for a fourth wavelength are extracted as described with reference to FIG. 28 at 1830a. At 1831b a first reflectance value with sun cream at the first wavelength, a second reflectance value with sun cream at the second wavelength, a third reflectance value with sun cream at the third wavelength and a fourth reflectance value with sun cream at the fourth wavelength are derived. The first reflectance value with sun cream at the first wavelength is derived from the first radiation value reflected from the location on the user's skin at the first wavelength and a radiation value of a defined radiation spectrum of the sensor light source at the first wavelength retrieved from the data storage. The second reflectance value, the third reflectance value and the fourth reflectance value are derived analogous to the first reflectance value. The first reflectance value may be the value $O(\lambda_1)$ at the first wavelength $\lambda_1$ of 375 nm, the second reflectance value may be the value $O(\lambda_2)$ at the first wavelength $\lambda_2$ of 400 nm in FIG. 20. At 1832b a first reflectance ratio of the first reflectance value and the second reflectance value, a second reflectance ratio of the first reflectance value and the third reflectance value, a third reflectance ratio of the second reflectance value and the third reflectance value and a fourth reflectance ratio of the second reflectance value and the fourth reflectance value are created. The first reflectance ratio is created by dividing the first reflectance value with sun cream at the first wavelength by the second reflectance value with sun cream at the second wavelength. The second reflectance ratio, the third reflectance ratio and the fourth reflectance ratio are derived analogous to the first reflectance ratio. The first reflectance ratio amounts 0.05 in case that the first reflectance ration is derived from the first reflectance value $O(\lambda_1)$ and the second reflectance value $O(\lambda_2)$ of FIG. 20. At 1833b each reflectance ratio is compared to corresponding reference reflectance ratios including a reference reflectance ratio relating to a sun cream with organic filters, a reference reflectance ratio relating to a sun cream with inorganic filters and a reference reflectance ratio relating to a sun cream with mixed filters. For the first reflectance ratio the reference reflectance ratio relating to a sun cream with inorganic filters is 0.05, the reference reflectance ratio relating to a sun cream with inorganic filters is 0.2 and the reference reflectance ratio relating to a sun cream with mixed filters is 0.15. Then, for each radiation value ratio the reference reflectance ratio having the greatest similarity to the reflectance ratio is identified. At 1834b the filter type of the applied sun cream is determined based on the identified reference reflectance ratios. Instead of determining the filter type of the applied sun cream based on the first radiation value, the second radiation value, the third radiation vale and the fourth radiation value as described with respect to FIG. 28 and FIG. 29, it is also possible to determine the filter type of the applied sun cream based on two or three values of the first radiation value, the second radiation value, the third radiation vale and the fourth radiation value.

Figure 30:
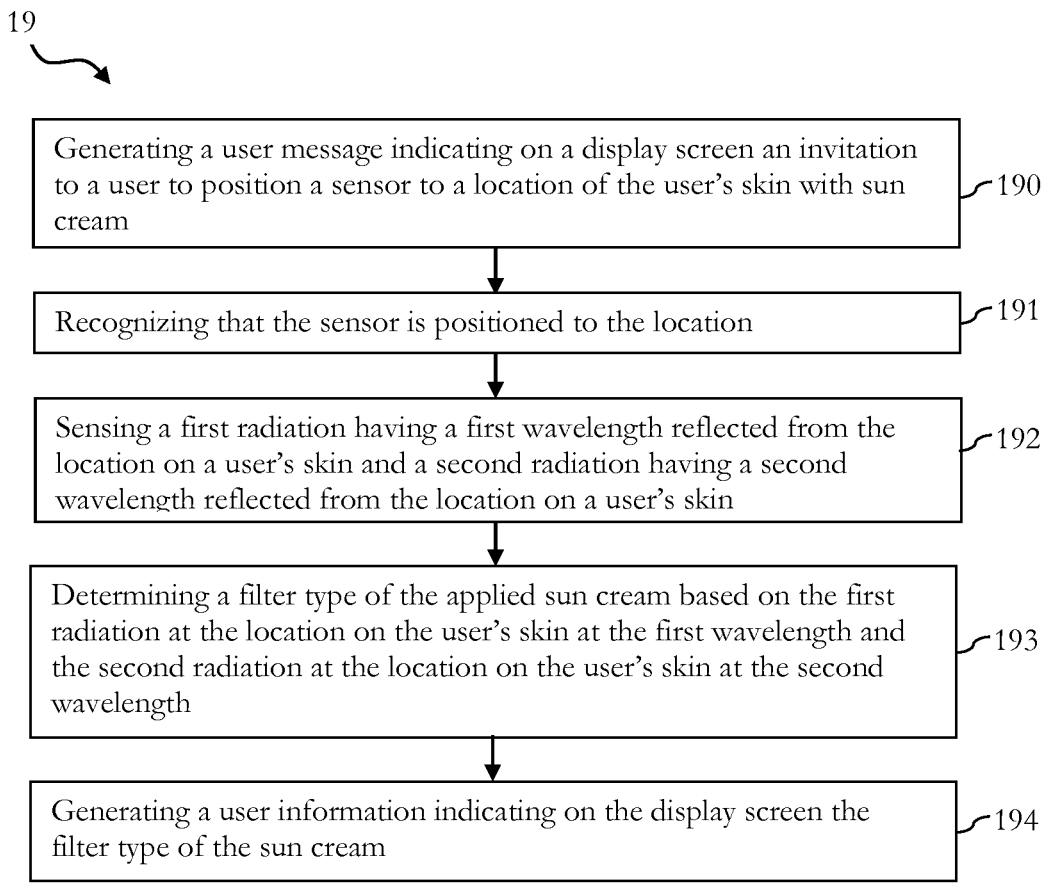
FIG. 30 schematically illustrates a third method for providing a filter type of sun cream is applied to a user's skin.

FIG. 30 schematically illustrates a method 18 for providing a filter type of a sun cream applied to a user's skin. At 190 a user message is generated indicating on a display screen an invitation to a user to position a sensor to a location of the user's skin, where sun cream is applied. At 191 it is recognized that the sensor is positioned to the location of the user's skin. Recognizing that the sensor is positioned to the location is carried out as described with reference to FIG. 21 at S111. At 192 a first radiation having a first wavelength reflected from the location on the user's skin and a second radiation having a second wavelength reflected from the location on the user's skin is sensed. A sensor 20a configured to sense a radiation like the first radiation and the second radiation is explained below with respect to FIG. 27. The first wavelength is a wavelength in the range from 375 nm to 395 nm, e.g. of 385 nm, and the second wavelength is a wavelength in a range from 395 nm to 405 nm, e.g. of 400 nm. At 193 a filter type of the applied sun cream is determined based on the sensed first radiation and the sensed second radiation. This is explained in detail with reference to FIG. 28 at 1831a to 1833a and to FIG. 29 at 1831b to 1834b above. At 194 a user information is generated indicating on the display screen the filter type of the sun cream to the user.

Figure 31:
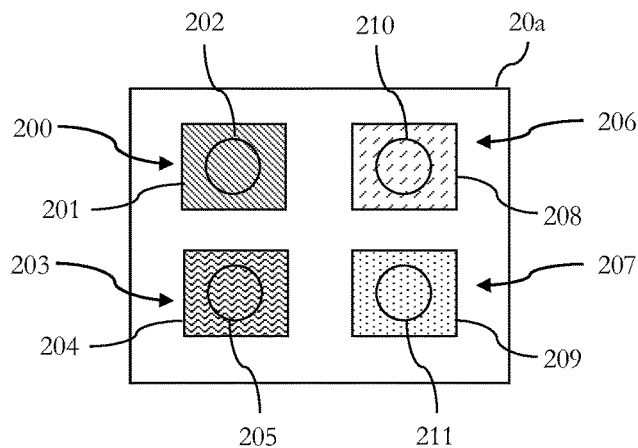
FIG. 31 schematically illustrates an example for a sensor for sensing a radiation having a single predetermined wavelength.

The sensor 20a shown by FIG. 31 may include a first camera arrangement 200 including a camera and an optical filter 201 arranged in front of a camera opening 202, wherein the optical filter 201 is transmissive only for light having the first wavelength, and a second camera arrangement 203 including a camera and an optical filter 204 arranged in front of a camera opening 205, wherein the optical filter 204 is transmissive only for light having the second wavelength. Additionally, the sensor 20a may include further camera arrangements 206, 207, each including a camera and an optical filter 208, 209 arranged in front of a camera opening 210, 211, wherein the respective optical filter 208, 209 is transmissive only for light having a predetermined wavelength, e.g. the third wavelength or the fourth wavelength.

The sensor 20a may be used as sensor 20 in FIG. 2A and FIG. 2B. Accordingly, light emitted by the sensor light source 21 towards the user's skin is reflected by the user's skin and oriented towards the sensor. The sensor 20a receives radiation at the first wavelength and second wavelength of the radiation reflected from the user's skin.

Figure 32:
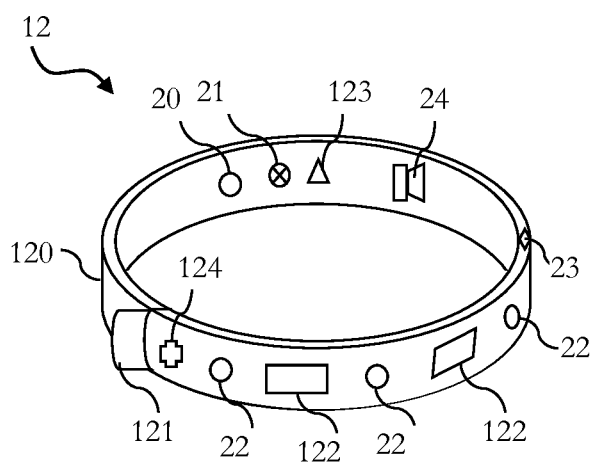
FIG. 32 schematically illustrates an embodiment of an electronic device in form of an electronic wristband configured to provide a user with a skin surface condition information.

FIG. 32 schematically illustrates an embodiment of an electronic device in form of an electronic wristband 12 configured to provide a user with a skin surface condition information. The electronic wristband 12 includes a wristband body 120 formed of synthetic material and provided with a fastener 121, which allows the user to easily take the wristband body 120 on and off the wrist. The electronic wristband 12 includes a sensor 20 configured to detect radiation reflected from the user's skin and a light source 21 assigned to the sensor 20, which are arranged on an inner side of the wristband body 120 oriented towards the user's skin. The electronic wristband 12 includes several sensors 22 configured to detect sun light and arranged on an outer side of the wristband body 120 opposite to the inner side thereof. The electronic wristband 12 further includes several solar cells used as energy source arranged on the outer side of the wristband body 120. In addition, the electronic wristband 12 includes user interfaces such as a loudspeaker 24 on the inner side of the wristband body 120 and a LED 23 on a lateral side of the wristband body 120. Furthermore, the wristband body 120 may be provided with a wireless communication interface 124 and with a body temperature sensor 123.

Figure 33:
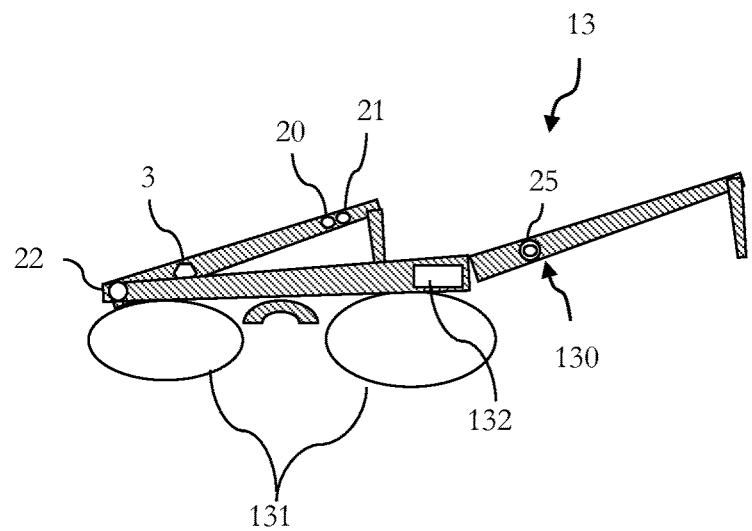
FIG. 33 schematically illustrates an embodiment of an electronic device in form of electronic glasses configured to provide a user with a skin surface condition information.

FIG. 33 schematically illustrates an embodiment of an electronic device in form of electronic glasses 13 configured to provide a user with a skin surface condition information. The electronic glasses 13 include a glasses frame 130 and lenses 131. The electronic glasses 13 include a sensor 20 configured to detect radiation reflected from the user's skin and a light source 21 assigned to the sensor 20, which are arranged on an inner side of the glasses frame 130 at a position which is in contact with the skin of the user wearing the electronic glasses 13. The electronic glasses 13 further include a sensor 22 configured to detect sun light which is arranged on an outer side of the glasses frame 130 above the lenses 131. The electronic glasses 13 also include a user interface such as a vibration generator 25 arranged on the glasses frame 130. The electronic glasses 13 are further provided with solar cells arranged on the glasses frame 130 above the lenses 131.

Figure 34:
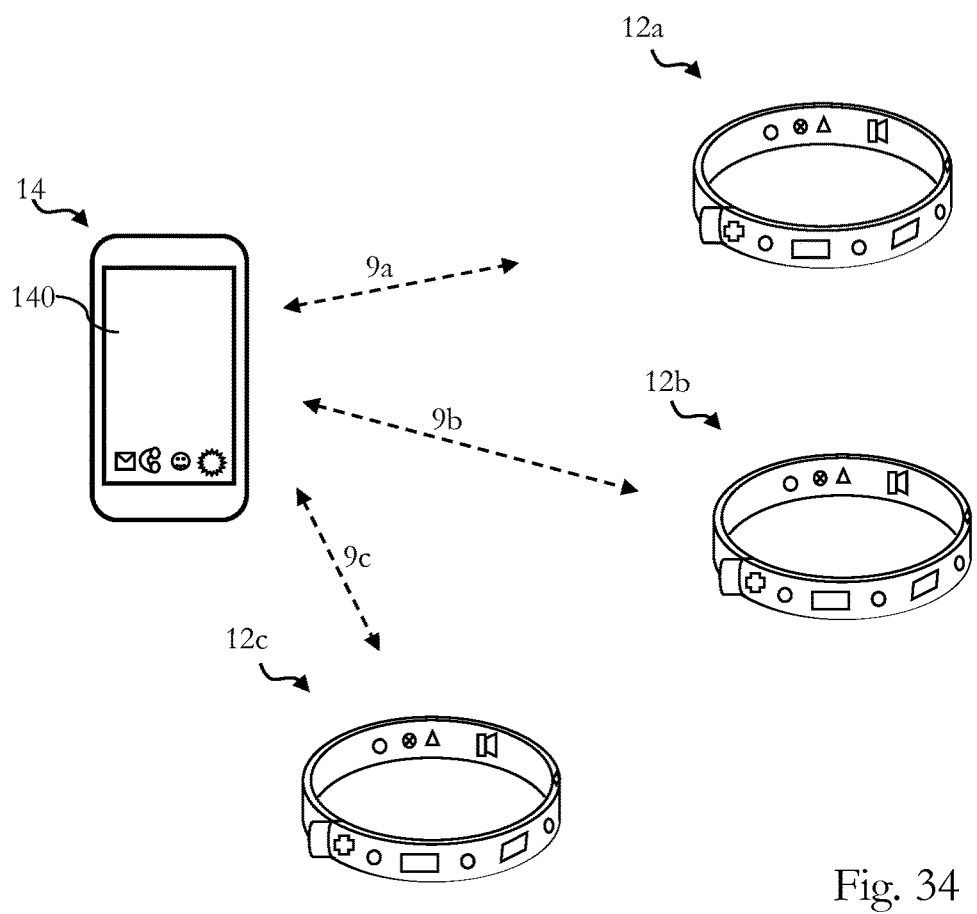
FIG. 34 schematically illustrates a system including a smart phone and electronic wristbands configured to monitor users of the electronic wristbands via the smart phone.

FIG. 34 schematically illustrates a system including a smart phone 14 and electronic wristbands 12a, 12b, 12c which are formed like the electronic wristband 12 described with reference to FIG. 28. The smart phone 14 includes a wireless communication interface (not shown). Via the wireless communication interface of the smart phone 14 the smart phone 14 is configured to receive 9a, 9b, 9c sun bathing parameters determined by each of the electronic wristbands 12a, 12b, 12c. Thus, the smart phone 14 receives skin surface condition information corresponding to different users, for example of children to be monitored by a third person, for example a parent. The smart phone 14 is configured to present the skin surface condition information of the children on a display screen 140 of the smart phone 14 to inform the parent if one or more of the children shall go out of the sun light to avoid risks for their health.

Figure 35:
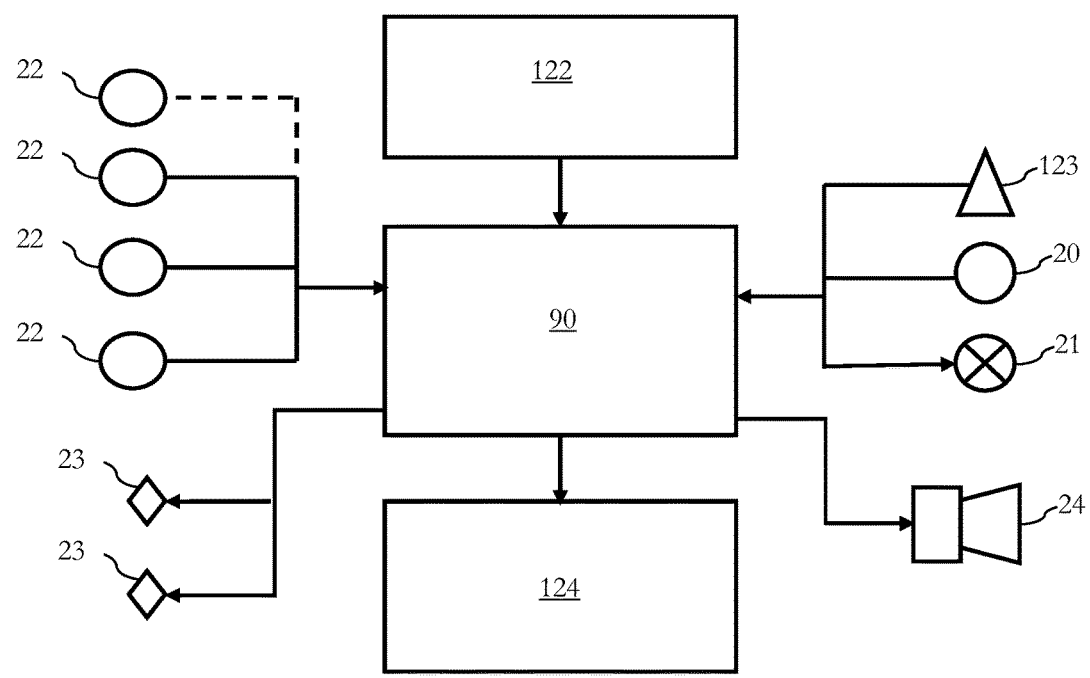
FIG. 35 schematically illustrates an embodiment of an electronic device configured to provide a user with a skin surface condition information.

FIG. 35 schematically illustrates an embodiment of an electronic device configured to provide a user with a skin surface condition information. The electronic device includes a sensor 20 configured to detect radiation reflected from the user's skin and a light source 21 assigned to the sensor 20, which are connected to a processor 90. The electronic device further includes several sensors 22 configured to detect sun light, which are connected to the processor 90. In addition, the electronic device includes a body temperature sensor 123 connected to the processor 90. The processor 90 is electrically connected to a solar cell as power source. The processor 90 is configured to control the light source 21, to receive data from the sensors 20, 22, 124 and to determine a sun bathing parameter based on the received data. The electronic device further includes LEDs 23 and a communication interface 124 so as to provide the skin surface condition information to the user.

It should be recognized that the embodiments describe methods with an exemplary ordering of method steps. The specific ordering of method steps is however given for illustrative purposes only and should not be construed as binding.

The method described above can be implemented as a computer program causing a computer and/or a processor, such as processor 90 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A method, including:
receiving a first radiation measurement; and
determining a skin surface condition information based on the first radiation measurement.

(2) The method of (1) further including:
receiving a second radiation measurement,
wherein the skin surface condition information is determined based on the first radiation measurement and the second radiation measurement.

(3) The method of (1) or (2), wherein determining the skin surface condition information includes:
determining a skin type parameter of a user by comparing the first radiation measurement to a reference radiation measurement.

(4) The method of (2) or (3), wherein
the first radiation measurement corresponds to a radiation reflected from a location on a user's skin before or after applying sun cream to a surrounding area of the user's skin surrounding the location on the user's skin;
the second radiation measurement corresponds to an ambient radiation; and
the skin surface condition information is a time period, a required sun protection factor and/or a required amount of sun cream and/or a user information to stop sunbathing.

(5) Method of any one of (2) to (4), wherein
the first radiation measurement corresponds to a radiation reflected from a location on a user's skin before or after applying sun cream to a surrounding area of the user's skin surrounding the location on the user's skin; and
the second radiation measurement corresponds to an ambient radiation; and wherein
determining the skin surface condition information includes:
determining a skin type parameter of a user by comparing the first radiation measurement to a reference radiation measurement; and
determining a time period by choosing the time period corresponding to the determined skin type parameter and the second radiation measurement from a data model indicating for various skin type parameters and for various second radiation measurements a corresponding time period.

(6) Method of claim any one of (2) to (4), wherein
the first radiation measurement corresponds to a radiation reflected from a first location on a user's skin before or after applying sun cream to a surrounding area of the user's skin surrounding the location on the user's skin; and
the second radiation measurement corresponds to an ambient radiation; wherein
the method includes
repeatedly receiving the second radiation measurement; and wherein
determining the skin surface condition information includes:
determining a radiation dose threshold based on the first radiation measurement;
repeatedly accumulating the received second radiation measurements to obtain a radiation dose value;
repeatedly comparing the obtained radiation dose value to the radiation dose threshold; and
generating a user information to stop sunbathing, when the radiation dose value exceeds the radiation dose threshold.

(7) Method of (2) or (3), wherein
the first radiation measurement corresponds to a radiation reflected from a first location on a user's skin;
the second radiation measurement corresponds to a radiation reflected from a second location on the user's skin within a surrounding area surrounding the first location; and
the skin surface condition information is information whether sun cream is applied to the second location.

(8) Method of (7), wherein
the first radiation measurement, during which no sun cream is applied to the surrounding area surrounding the first location, is stored in advance, and wherein the second radiation measurement, during which it is not known whether sun cream is applied to the second location, is sensed in real time.

(9) Method of (2) or (3), wherein the first radiation measurement corresponds to a radiation reflected from a first location on a user's skin, wherein no sun cream is applied to a surrounding area of the user's skin surrounding the first location;

the second radiation measurement corresponds to a radiation reflected from a second location on the user's skin within the surrounding area after applying sun cream to the surrounding area; and/or the skin surface condition information is a filter type of the applied sun cream, an actual sun protection factor and/or an actual amount of sun cream.

(10) Method of any one of (2, (3) or (9), wherein the first radiation measurement corresponds to a radiation reflected from a first location on a user's skin, wherein no sun cream is applied to a surrounding area of the user's skin surrounding the first location;

the second radiation measurement corresponds to a radiation reflected from a second location on the user's skin within the surrounding area after applying sun cream to the surrounding area; and determining the skin surface condition information includes:

determining an actual sun protection factor by comparing the first radiation measurement to a reference radiation measurement, by comparing the second radiation measurement to the reference radiation measurement and by comparing the results thereof.

(11) Method of any one of (2), (3) or (9), wherein the first radiation measurement corresponds to a radiation reflected from a first location on a user's skin, wherein no sun cream is applied to a surrounding area of the user's skin surrounding the first location;

the second radiation measurement corresponds to a radiation reflected from a second location on the user's skin within the surrounding area after applying sun cream to the surrounding area; and determining the skin surface condition information includes:

extracting at two predetermined wavelengths a respective reflectance value from the first radiation measurement, extracting at the two predetermined wavelengths a respective reflectance value from the second radiation measurement, relating the reflectance values extracted from the first radiation measurement to each other, relating the reflectance values extracted from the second radiation measurement to each other; and comparing the results thereof to determine a filter type of the applied sun cream.

(12) Method of any one of (2), (3), (9), (10) or (11), further including:

receiving a third radiation measurement, wherein the first radiation measurement corresponds to a radiation reflected from a first location on a user's skin before applying sun cream to a surrounding area of the user's skin surrounding the first location;

the second radiation measurement corresponds to a radiation reflected from a second location on the user's skin within the surrounding area after applying sun cream to the surrounding area;

the third radiation measurement corresponds to an ambient radiation; and the skin surface condition information is a time period, a required sun protection factor and/or a required amount of sun cream and/or a user information to stop sunbathing; and wherein determining the skin surface condition information is further based on the third radiation measurement.

(13) Method of any one of (2), (3), (9), (10), (11) or (12), further including:

receiving a third radiation measurement, wherein the first radiation measurement corresponds to a radiation reflected from a first location on a user's skin before applying sun cream to a surrounding area of the user's skin surrounding the first location;

the second radiation measurement corresponds to a radiation reflected from a second location on the user's skin within the surrounding area after applying sun cream to the surrounding area; and the third radiation measurement corresponds to an ambient radiation; wherein determining the skin surface condition information includes:

determining a skin type parameter of the user by comparing the first radiation measurement to a reference radiation measurement;

determining an actual sun protection factor based on the first radiation measurement and the second radiation measurement by comparing the first radiation measurement to the reference radiation measurement, by comparing the second radiation measurement to the reference radiation measurement and by comparing the results thereof; and determining a time period by choosing the time period corresponding to the determined skin type, the determined actual sun protection factor and the third radiation measurement from a data model indicating for various skin type parameters, for various sun protection factors and for various third radiation measurements a corresponding time period.

(14) Method of any one of (2), (3), (9), (10), (11) or (12), further including:

repeatedly receiving a third radiation measurement; wherein the first radiation measurement corresponds to a radiation reflected from a first location on a user's skin before applying sun cream to a surrounding area of the user's skin surrounding the first location;

the second radiation measurement corresponds to a radiation reflected from a second location on the user's skin within the surrounding area after applying sun cream to the surrounding area; and the third radiation measurement corresponds to an ambient radiation; wherein determining the skin surface condition information includes:

determining a skin type parameter of the user by comparing the first radiation measurement to a reference radiation measurement;

determining an actual sun protection factor based on the first radiation measurement and the second radiation measurement by comparing the first radiation measurement to the reference radiation measurement, by comparing the second radiation measurement to the reference radiation measurement and by comparing the results thereof;

determining a radiation dose threshold based on the skin type parameter and the sun protection factor;

repeatedly accumulating the received third radiation measurements to obtain a radiation dose value;
repeatedly comparing the obtained radiation dose value to the radiation dose threshold; and
generating a user information to stop sunbathing, when the radiation dose exceeds the radiation dose threshold.

(15) Method of any one of (1) to (14), including
receiving two or more first radiation measurements each corresponding to a radiation reflected from different locations on a user's skin before or after applying sun cream to one or more surrounding areas of the user's skin surrounding the different locations on the user's skin; and
choosing the first radiation measurement of the two or more first radiation measurements which indicates the most sun sensitive location of the different locations,
wherein determining the skin surface condition information is based on the chosen first radiation measurement.

(16) Method of any one of (1) to (15), including
receiving two or more first radiation measurements each corresponding to a radiation reflected from different locations on a user's skin before applying sun cream to one or more surrounding areas of the user's skin surrounding the different locations on the user's skin;
choosing the first radiation measurement of the two or more first radiation measurements which indicates the most sun sensitive location of the different locations,
receiving two or more second radiation measurements each corresponding to a radiation reflected from different locations on the user's skin after applying sun cream to one or more surrounding areas of the user's skin surrounding the different locations on the user's skin;
choosing the second radiation measurement of the two or more first radiation measurements which indicates the most sun sensitive location of the different locations,
wherein determining the skin surface condition information is based on the chosen first radiation measurement and the chosen second radiation measurement.

(17) Method of (2), wherein
the first radiation measurement corresponds to a radiation having a first wavelength reflected from a location on a user's skin;
the second radiation measurement corresponds to a radiation having a second wavelength reflected from the location on the user's skin; and
determining the skin surface condition information includes:
  determining information, whether sun cream is applied, a filter type of the applied sun cream, an actual sun protection factor and/or an actual amount of sun cream based on a relation between the first radiation measurement and the second radiation measurement.

(18) Method of (17), wherein
no sun cream is applied to the location on the user's skin; the method further includes:
  receiving a third radiation measurement corresponding to a radiation having the first wavelength reflected from a further location on a user's skin, wherein it is not known, whether sun cream is applied to the further location;
  receiving a fourth radiation measurement corresponding to a radiation having the second wavelength reflected from the further location on the user's skin; and
  determining the skin surface condition information includes:
    determining information, whether sun cream is applied, by relating the radiation having the first wavelength reflected from the location to the radiation having the second wavelength reflected from the location, relating the radiation having the first wavelength reflected from the further location to the radiation having the second wavelength reflected from the further location and comparing the relation results thereof.

(19) Method of (17) or (18), wherein
determining the skin surface condition information includes:
  determining a filter type of the applied sun cream by relating the radiation having the first wavelength to the radiation having the second wavelength and comparing the relation result thereof to a reference relation.

(20) Method of any one of (1) to (19), wherein receiving the first radiation measurement includes receiving the first radiation measurement from a sensor arrangement.

(21) Method of (20), further including:
generating a first user message indicating a first invitation to the user to position the sensor arrangement so that the sensor arrangement detects the first radiation measurement and providing the first invitation to a user interface.

(22) Method of any one of (2) to (21), wherein receiving the second radiation measurement includes receiving the second radiation measurement from a sensor arrangement.

(23) Method of (22), further including:
generating a second user message indicating a second invitation to the user to position the sensor arrangement so that the sensor arrangement detects the second radiation measurement and providing the second invitation to the user interface.

(24) Method of any one of (1) to (23), including:
receiving environmental information, wherein the skin surface condition information is determined further based on the environmental information.

(25) Method of any one of (1) to (24), including:
generating a user information indicting the determined skin surface condition information to the user or to another user and providing the user information to a user interface and/or to a communication interface.

(26) Method of any one of (1) to (25), wherein radiation measurements are received from sensors located in personal devices.

(27) Electronic device including a processor configured to:
receive a first radiation measurement; and
determine a skin surface condition information based on the first radiation measurement.

(28) Electronic device of (27), wherein the processor is further configured to:
receive a second radiation measurement,
wherein the skin surface condition information is determined based on the first radiation measurement and the second radiation measurement.

(29) Electronic device of (27) or (28), wherein the processor is configured to carry out a method according to any one of (1) to (26).

(30) Electronic device of any one of (27) to (29), including a sensor arrangement configured to detect the first radiation measurement and/or to detect the second radiation measurement and to provide the first radiation measurement and/or the second radiation measurement to the processor.

(31) Electronic device of any one of (27) to (30), wherein the sensor arrangement includes at least one spectral sensor and/or a sensor light source.

(32) Electronic device of any one of (27) to (31), wherein the sensor arrangement includes at least one camera arrangement including a camera and an optical filter arranged in front of a camera opening, wherein the optical filter is transmissive only for light having a predetermined wavelength and a sensor light source.

(33) Electronic device of any one of (27) to (32), including a storage configured to store the first radiation measurement and/or the second radiation measurement and to provide the first radiation measurement and/or the second radiation measurement to the processor.

(34) Electronic device of any one of (27) to (33), including
- a user interface and/or a communication interface, wherein
- the processor is configured
  - to generate a first user message indicating a first invitation to the user to position a sensor so that the sensor detects the first radiation measurement and/or to generate a second user message indicating a second invitation to the user to position a sensor so that the sensor detects the second radiation measurement and/or to generate a user information indicting the determined skin surface condition information to the user and/or to another user and
  - to provide the first invitation, the second invitation and/or the information to the user interface, wherein the user interface is configured to output the first invitation, the second invitation and/or the determined skin surface condition information, and/or
  - to provide the user information to the communication interface.

(35) Electronic device of any one of (27) to (34), the electronic device is one selected from a smart phone, a tablet computer, a portable game console, a smart watch, an electronic wristband, smart glasses, an e-book reader or a mobile digital media player.

(36) Electronic device of any one of (27) to (35), including a communication interface configured to receive radiation measurements received from sensors located in personal devices.

(37) A system, including a main device including a processor configured to carry out a method for providing a skin surface condition information according to any one of (1) to (26) and several personal devices, wherein radiation measurements are received from sensors located in the personal devices.

(38) A system including a main device and several personal devices each including a processor configured to carry out a method for providing a skin surface condition information according to any one of (1) to (26), wherein the sun bathing parameters are provided from the personal devices to the main device.

(39) A computer program including program code causing a computer to perform the method according to anyone of (1) to (26), when being carried out on a computer.

(40) A non-transitory computer-readable recording medium that stores therein a computer program product, which, when executed by a processor, causes the method according to anyone of (1) to (26) to be performed.

The invention claimed is:

1. An electronic device, comprising
a processor configured to:
receive a first radiation measurement,
determine a skin surface condition information based on the first radiation measurement, and
receive a second radiation measurement,
wherein the skin surface condition information is determined based on the first radiation measurement and the second radiation measurement,
wherein the first radiation measurement corresponds to a radiation reflected from a first location on a user's skin,
wherein the second radiation measurement corresponds to a radiation reflected from a second location on the user's skin within a surrounding area of the first location, and
the skin surface condition information is information whether an ultraviolet radiation reducing substance is applied to the second location.

2. The electronic device of claim 1, wherein the processor is configured so that determining the skin surface condition information includes:
determining a skin type parameter of a user by comparing the first radiation measurement to a reference radiation measurement.

3. The electronic device of claim 1, wherein the processor is configured so that
the first radiation measurement corresponds to a radiation reflected from a location on a user's skin before or after applying the ultraviolet radiation reducing substance to a surrounding area of the user's skin surrounding the location on the user's skin;
the second radiation measurement corresponds to an ambient radiation; and
the skin surface condition information is a time period, a required sun protection factor and/or a required amount of the ultraviolet radiation reducing substance and/or a user information to stop sunbathing.

4. The electronic device of claim 1, wherein the processor is configured so that
the first radiation measurement corresponds to a radiation reflected from a location on a user's skin before or after applying the ultraviolet radiation reducing substance to a surrounding area of the user's skin surrounding the location on the user's skin; and
the second radiation measurement corresponds to an ambient radiation; and wherein
determining the skin surface condition information includes:
determining a skin type parameter of a user by comparing the first radiation measurement to a reference radiation measurement; and
determining a time period by choosing the time period corresponding to the determined skin type parameter and the second radiation measurement from a data model indicating for various skin type parameters and for various second radiation measurements a corresponding time period.

5. The electronic device of claim 1, wherein the processor is configured so that
the first radiation measurement corresponds to a radiation reflected from a location on a user's skin before or after applying the ultraviolet radiation reducing substance to a surrounding area of the user's skin surrounding the location on the user's skin; and
the second radiation measurement corresponds to an ambient radiation;
wherein the processor is further configured to repeatedly receive the second radiation measurement; and
wherein determining the skin surface condition information includes:

determining a radiation dose threshold based on the first radiation measurement;
repeatedly accumulating the received second radiation measurements to obtain a radiation dose value;
repeatedly comparing the obtained radiation dose value to the radiation dose threshold; and
generating a user information to stop sunbathing, when the radiation dose value exceeds the radiation dose threshold.

6. The electronic device of claim 1, wherein the processor is configured so that
the skin surface condition information is information whether sun cream is applied to the second location.

7. The electronic device of claim 1, wherein the processor is configured so that
the first radiation measurement corresponds to a radiation reflected from the first location on a user's skin, wherein none of the ultraviolet radiation reducing substance is applied to a surrounding area of the user's skin surrounding the first location;
the second radiation measurement corresponds to a radiation reflected from the second location on the user's skin within the surrounding area after applying the ultraviolet radiation reducing substance to the surrounding area; and/or
the skin surface condition information is a filter type of the applied ultraviolet radiation reducing substance, an actual sun protection factor and/or an actual amount of the ultraviolet radiation reducing substance.

8. The electronic device of claim 1, wherein the processor is configured so that
the first radiation measurement corresponds to a radiation reflected from the first location on a user's skin, wherein none of the ultraviolet radiation reducing substance is applied to a surrounding area of the user's skin surrounding the first location;
the second radiation measurement corresponds to a radiation reflected from the second location on the user's skin within the surrounding area after applying the ultraviolet radiation reducing substance to the surrounding area; and
determining the skin surface condition information includes:
determining an actual sun protection factor by comparing the first radiation measurement to a reference radiation measurement, by comparing the second radiation measurement to the reference radiation measurement and by comparing the results thereof.

9. The electronic device of claim 1, wherein the processor is configured so that
the first radiation measurement corresponds to a radiation reflected from the first location on a user's skin, wherein none of the ultraviolet radiation reducing substance is applied to a surrounding area of the user's skin surrounding the first location;
the second radiation measurement corresponds to a radiation reflected from the second location one user's skin within the surrounding area after applying the ultraviolet radiation reducing substance to the surrounding area; and
determining the skin surface condition information includes:
extracting at two predetermined wavelengths a respective reflectance value from the first radiation measurement,
extracting at the two predetermined wavelengths a respective reflectance value from the second radiation measurement,
relating the reflectance values extracted from the first radiation measurement to each other,
relating the reflectance values extracted from the second radiation measurement to each other; and
comparing the results thereof to determine a filter type of the applied ultraviolet radiation reducing substance.

10. The electronic device of claim 1, wherein the processor is configured to
receive a third radiation measurement,
wherein the processor is configured so that
the first radiation measurement corresponds to a radiation reflected from the first location on a user's skin before applying the ultraviolet radiation reducing substance to a surrounding area of the user's skin surrounding the first location;
the second radiation measurement corresponds to a radiation reflected from the second location on the user's skin within the surrounding area after applying the ultraviolet radiation reducing substance to the surrounding area;
the third radiation measurement corresponds to an ambient radiation; and
the skin surface condition information is a time period, a required sun protection factor and/or a required amount of the ultraviolet radiation reducing substance and/or a user information to stop sunbathing; and wherein
determining the skin surface condition information is further based on the third radiation measurement.

11. The electronic device of claim 1, wherein the processor is configured to
receive a third radiation measurement,
wherein the processor is configured so that
the first radiation measurement corresponds to a radiation reflected from the first location on a user's skin before applying the ultraviolet radiation reducing substance to a surrounding area of the user's skin surrounding the first location;
the second radiation measurement corresponds to a radiation reflected from the second location on the user's skin within the surrounding area after applying the ultraviolet radiation reducing substance to the surrounding area; and
the third radiation measurement corresponds to an ambient radiation; wherein
determining the skin surface condition information includes:
determining a skin type parameter of the user by comparing the first radiation measurement to a reference radiation measurement;
determining an actual sun protection factor based on the first radiation measurement and the second radiation measurement by comparing the first radiation measurement to a reference radiation measurement, by comparing the second radiation measurement to the reference radiation measurement and by comparing the results thereof; and
determining a time period by choosing the time period corresponding to the determined skin type, the determined actual sun protection factor and the third radiation measurement from a data model indicating for various skin type parameters, for various sun protection factors and for various third radiation measurements a corresponding time period.

12. The electronic device of claim 1, wherein the processor is configured to
repeatedly receive a third radiation measurement;
wherein the processor is configured so that
the first radiation measurement corresponds to a radiation reflected from the first location on a user's skin before applying the ultraviolet radiation reducing substance to a surrounding area of the user's skin surrounding the first location;
the second radiation measurement corresponds to a radiation reflected from the second location on the user's skin within the surrounding area after applying the ultraviolet radiation reducing substance to the surrounding area; and
the third radiation measurement corresponds to an ambient radiation; wherein
determining the skin surface condition information includes:
determining a skin type parameter of the user by comparing the first radiation measurement to a reference radiation measurement;
determining an actual sun protection factor based on the first radiation measurement and the second radiation measurement by comparing the first radiation measurement to a reference radiation measurement, by comparing the second radiation measurement to the reference radiation measurement and by comparing the results thereof;
determining a radiation dose threshold based on the skin type parameter and the sun protection factor;
repeatedly accumulating the received third radiation measurements to obtain a radiation dose value;
repeatedly comparing the obtained radiation dose value to the radiation dose threshold; and
generating a user information to stop sunbathing, when the radiation dose exceeds the radiation dose threshold.

13. The electronic device of claim 1, wherein the processor is configured to
receive two or more first radiation measurements each corresponding to a radiation reflected from different locations on a user's skin before or after applying the ultraviolet radiation reducing substance to one or more surrounding areas of the user's skin surrounding the different locations on the user's skin; and
choose the first radiation measurement of the two or more first radiation measurements which indicates the most sun sensitive location of the different locations,
wherein determining the skin surface condition information is based on the chosen first radiation measurement.

14. The electronic device of claim 1, wherein the processor is configured so that
the first radiation measurement corresponds to a radiation having a first wavelength reflected from a location on a user's skin;
the second radiation measurement corresponds to a radiation having a second wavelength reflected from the location on the user's skin; and
determining the skin surface condition information includes:
determining information, whether the ultraviolet radiation reducing substance is applied, a filter type of the applied ultraviolet radiation reducing substance, an actual sun protection factor and/or an actual amount of the ultraviolet radiation reducing substance based on a relation between the first radiation measurement and the second radiation measurement.

15. The electronic device of claim 14, wherein the processor is configured so that
determining the skin surface condition information includes:
determining information, whether the ultraviolet radiation reducing substance is applied, a filter type of the applied ultraviolet radiation reducing substance by relating the radiation having the first wavelength to the radiation having the second wavelength and comparing the relation result thereof to a reference relation.

16. The electronic device of claim 1, wherein the processor is configured so that
receiving the first radiation measurement and the second radiation measurement includes receiving the first radiation measurement and the second radiation measurement from a sensor arrangement,
wherein the processor is configured to
generate a first user message indicating a first invitation to the user to position the sensor arrangement so that the sensor arrangement detects the first radiation measurement and providing the first invitation to a user interface; and/or
generate a second user message indicating a second invitation to the user to position the sensor arrangement so that the sensor arrangement detects the second radiation measurement and providing the second invitation to the user interface.

17. The electronic device of claim 1, wherein the processor is configured to
receive environmental information, wherein the skin surface condition information is determined further based on the environmental information.

18. The electronic device of claim 1, wherein the processor is configured to receive radiation measurements from sensors located in personal devices.

19. The electronic device of claim 1, further comprising a sensor arrangement configured to detect the first radiation measurement and/or to detect the second radiation measurement and to provide the first radiation measurement and/or the second radiation measurement to the processor.

20. The electronic device of claim 19, wherein the sensor arrangement includes a spectral sensor and a light source or a spectral sensor.

21. The electronic device of claim 1, further comprising a storage configured to store the first radiation measurement and/or the second radiation measurement and to provide the first radiation measurement and/or the second radiation measurement to the processor.

22. The electronic device of claim 1, further comprising a user interface and/or a communication interface, wherein
the processor is configured
to generate a first user message indicating a first invitation to the user to position a sensor so that the sensor detects the first radiation measurement and/or to generate a second user message indicating a second invitation to the user to position a sensor so that the sensor detects the second radiation measurement and/or to generate a user information indicting the determined skin surface condition information to the user and/or to another user and
to provide the first invitation signal, the second invitation signal and/or the information signal to the user interface, wherein the user interface is configured to output the first invitation, the second invitation and/or the determined skin surface condition information, and/or to provide the user information to the communication interface.

23. The electronic device of claim 1, wherein the electronic device is one selected from a smart phone, a tablet computer, a portable game console, a smart watch, an electronic wristband, smart glasses, an e-book reader or a mobile digital media player.

24. The electronic device of claim 1, further comprising a communication interface configured to receive radiation measurements received from sensors located in personal devices.

25. A method, comprising:

receiving a first radiation measurement;

determining a skin surface condition information based on the first radiation measurement; and receiving a second radiation measurement, wherein the skin surface condition information is determined based on the first radiation measurement and the second radiation measurement, wherein the first radiation measurement corresponds to a radiation reflected from a first location on a user's skin, wherein the second radiation measurement corresponds to a radiation reflected from a second location on the user's skin within a surrounding area of the first location, and the skin surface condition information is information whether an ultraviolet radiation reducing substance is applied to the second location.

* * * * *